(12) United States Patent
Jung et al.

(10) Patent No.: US 12,236,126 B2
(45) Date of Patent: Feb. 25, 2025

(54) STORAGE DEVICE, STORAGE SYSTEM AND THROTTLING METHOD THEREOF

(71) Applicant: Samsung Electronics Co., Ltd., Suwon-si (KR)

(72) Inventors: Kibeen Jung, Suwon-si (KR); Han Kyoo Lee, Suwon-si (KR); Byeonghui Kim, Suwon-si (KR); Hyunkyo Oh, Suwon-si (KR); Sungmin Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 14 days.

(21) Appl. No.: 18/127,922

(22) Filed: Mar. 29, 2023

(65) Prior Publication Data

US 2024/0168674 A1 May 23, 2024

(30) Foreign Application Priority Data

Nov. 18, 2022 (KR) .......................... 10-2022-0155658

(51) Int. Cl.
*G06F 3/06* (2006.01)
*G06N 20/00* (2019.01)

(52) U.S. Cl.
CPC ............ *G06F 3/0653* (2013.01); *G06F 3/061* (2013.01); *G06F 3/0656* (2013.01); *G06F 3/0679* (2013.01); *G06N 20/00* (2019.01)

(58) Field of Classification Search
CPC ...... G06F 3/0653; G06F 3/061; G06F 3/0656; G06F 3/0679; G06N 20/00
See application file for complete search history.

(56) References Cited

U.S. PATENT DOCUMENTS

| | | |
|---|---|---|
| 8,271,692 B1 | 9/2012 | Dinh et al. |
| 11,048,581 B2 | 6/2021 | Sinha et al. |
| 11,163,449 B2 | 11/2021 | Faibish et al. |
| 11,175,852 B2 | 11/2021 | Jung et al. |
| 11,212,196 B2 | 12/2021 | Wright et al. |
| 2020/0334577 A1* | 10/2020 | Anderson ............ G06Q 10/063 |
| 2021/0224675 A1 | 7/2021 | P. et al. |
| 2022/0180200 A1 | 6/2022 | Yu et al. |

FOREIGN PATENT DOCUMENTS

KR  20210119372 A  * 10/2021  ............. G06N 20/00

* cited by examiner

*Primary Examiner* — Masud K Khan
(74) *Attorney, Agent, or Firm* — Sughrue Mion, PLLC

(57) ABSTRACT

A throttling method for a storage device is provided. The throttling method includes: receiving a write command from a host; identifying, using a first machine learning model, a throttling delay time; transmitting a completion message to the host according to the throttling delay time; collecting weights of the first machine learning model and performance information of the storage device corresponding to the weights; learning the weights and the performance information to generate an objective function indicating a relationship between the weights and the performance information using a second machine learning model of a weight learning device; selecting a weight corresponding to a maximum performance using the objective function; and updating the first machine learning model with the weight.

20 Claims, 16 Drawing Sheets

STORAGE DEVICE, STORAGE SYSTEM AND THROTTLING METHOD THEREOF

CROSS-REFERENCE TO RELATED APPLICATION

This application claims priority to Korean Patent Application No. 10-2022-0155658, filed on Nov. 18, 2022, in the Korean Intellectual Property Office, the disclosure of which is incorporated by reference herein in its entirety.

BACKGROUND

The present disclosure relates to a semiconductor memory device, and more particularly, to a storage device, a storage system, and a throttling method thereof.

Flash memory devices are widely used as audio and video data storage media, and may be used with information devices such as computers, smart phones, personal digital assistants (PDAs), digital cameras, camcorders, voice recorders, MP3 players, and handheld computers. A representative example of a flash memory-based mass storage device is a solid state drive (SSD). With the explosive increase in demand for SSD, its uses are diversified. For example, SSDs may be used in general personal computer (PC) storage, built-in SSDs of mobile devices, external SSDs, SSDs for servers, SSDs for clients, and SSDs for data centers.

Various computer systems may include a host device equipped with an SSD. For example, the SSD may be connected to a server, data center, or a PC. In order to provide uniform performance, the SSD may perform a throttling operation. For example, when a write command is received, a policy of intentionally delaying the transmission time of a completion message to the host device according to an internal state of the SSD may be used. This feature may be referred to as write throttling.

When write throttling is applied, the delay time of the completion message (hereinafter referred to as throttling delay time) directly affects the quality of service (QoS) of the SSD. Setting an appropriate throttling latency is a very important factor in SSD service quality. However, related devices are not able to set an optimal throttling latency for each workload or state.

SUMMARY

One or more example embodiments provide a solid state drive capable of determining an optimal throttling delay time and a throttling method thereof.

According to an aspect of an example embodiment, a throttling method for a storage device, includes: receiving a write command from a host; identifying, using a first machine learning model, a throttling delay time; transmitting a completion message to the host according to the throttling delay time; collecting weights of the first machine learning model and performance information of the storage device corresponding to the weights; learning the weights and the performance information to generate an objective function indicating a relationship between the weights and the performance information using a second machine learning model of a weight learning device; selecting a weight corresponding to a maximum performance using the objective function; and updating the first machine learning model with the weight.

According to an aspect of an example embodiment, a storage device includes: a non-volatile memory device; a buffer memory configured to buffer write data corresponding to a write command before writing the write data to the non-volatile memory device; one or more processors configured to: identify a throttling delay time using a first machine learning model; collect weights of the first machine learning model and performance information of the storage device; and generate an objective function indicating a relationship between the weights and the performance information using a second machine learning model.

According to an aspect of an example embodiment, a storage system storage system includes: a storage device including one or more first processors configured to: identify a throttling delay time corresponding a write command from a host; and transmit a completion message to the host according to the throttling delay time; and weight learning device including one or more second processors configured to: collect weights of a first machine learning model and performance information of the storage device corresponding to the weights; and generate an objective function indicating a relationship between the weights and the performance information using a second machine learning model.

BRIEF DESCRIPTION OF DRAWINGS

The above and other aspects and features of the present disclosure will be more clearly understood from the following description of example embodiments, taken in conjunction with the accompanying drawings, in which.

DETAILED DESCRIPTION

Hereinafter, example embodiments are described in conjunction with the accompanying drawings. Embodiments described herein are example embodiments, and thus, the present disclosure is not limited thereto, and may be realized in various other forms. Each example embodiment provided in the following description is not excluded from being associated with one or more features of another example or another example embodiment also provided herein or not provided herein but consistent with the present disclosure. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c. It will be also understood that, even if a certain step or operation of manufacturing an apparatus or structure is described later than another step or operation, the step or operation may be performed later than the other step or operation unless the other step or operation is described as being performed after the step or operation.

Figure 1:
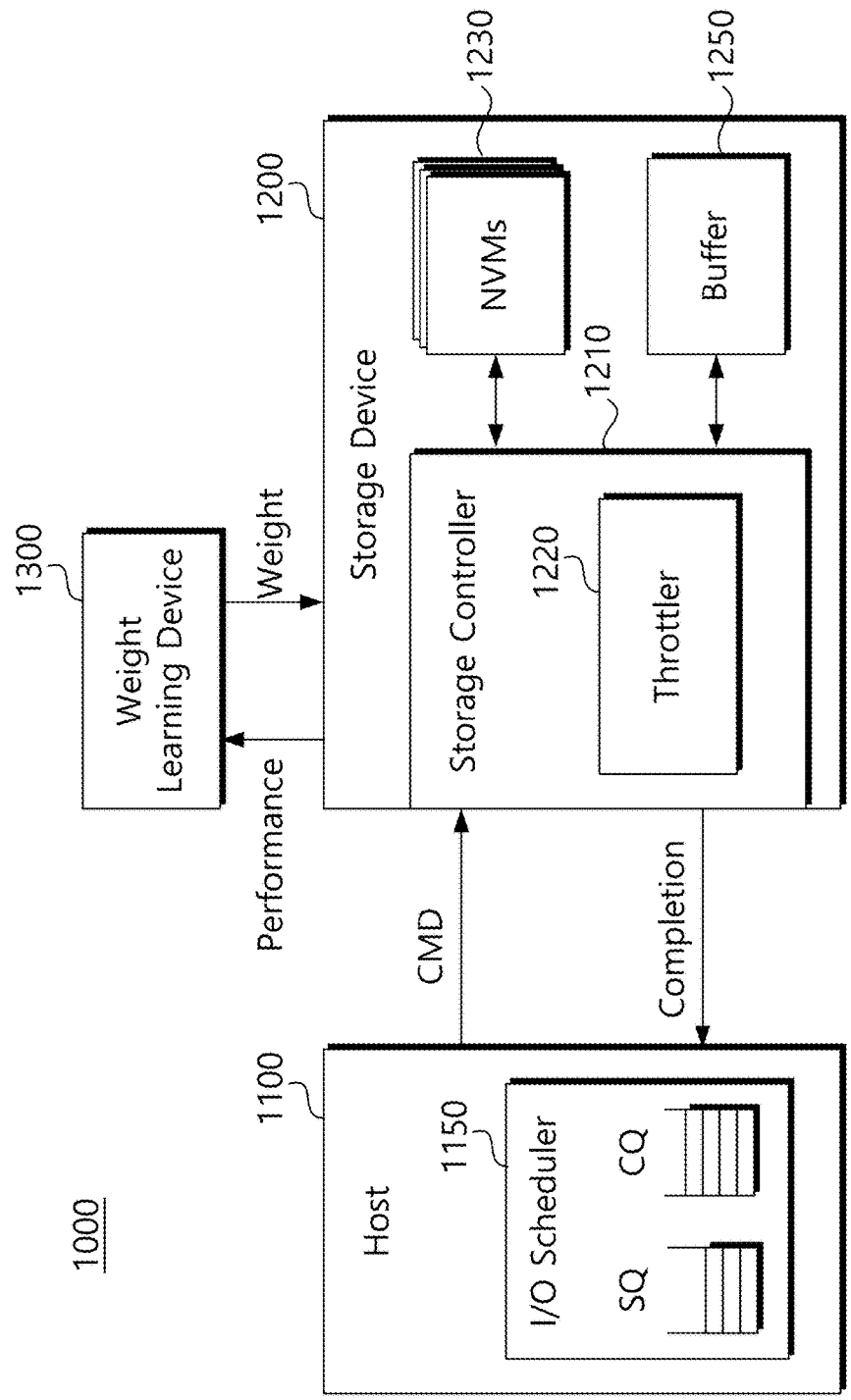
FIG. 1 is a block diagram showing a storage system according to an example embodiment.

FIG. 1 is a block diagram showing a storage system according to an example embodiment. Referring to FIG. 1, a storage system 1000 may include a host 1100, a storage device 1200, and a weight learning device 1300. In an example embodiment, the storage system 1000 may be a computing system configured to process various information, such as a PC, notebook, laptop, server, workstation, tablet PC, smart phone, and the like.

The host 1100 may be configured to control overall operations of the storage system 1000. The host 1100 may include one or more processors and one or more memories. The storage device 1200 may be used as a mass storage medium of the storage system 1000. In an example embodiment, the storage device 1200 may be an SSD mounted on the host 1100. Alternatively, the storage device 1200 may be a built-in SSD installed in the host 1100 or a removable memory card.

The host 1100 may include an I/O scheduler 1150 for managing a command queue to be transferred to the storage device 1200. For example, the I/O schedules 1150 may be controlled by the one or more processors of the host 1100. For example, the input/output scheduler 1150 may include a submission queue (hereinafter referred to as SQ) and a completion queue (hereinafter referred to as CQ). The submission queue SQ is a queue written by the host 1100 and corresponds to commands to be transmitted to the storage device 1200. The completion queue CQ is a queue of completion entries written by the storage device 1200 and indicates whether a command requested by the host 1100 is completed.

The submission queue SQ is written or supplied by the host 1100 and consumed by the storage device 1200. That is, the host 1100 advances a tail pointer (hereinafter referred to as TP) of the submission queue SQ, and a new position of the tail pointer TP is transmitted to the storage device 1200. Similarly, the storage device 1200 may advance a Header Pointer (hereinafter referred to as HP) of the submission queue SQ through provision of a complete entry. The completion queue CQ is written by the storage device 1200 and consumed by the host 1100. That is, the tail pointer TP of the completion queue CQ advances according to a completion message (Completion) provided from the storage device 1200. The host 1100 refers to the completion message (Completion) from the storage device 1200 to perform scheduling of a subsequent command.

The storage device 1200 may include a storage controller 1210, a nonvolatile memory device 1230, and a buffer 1250. The storage controller 1210 may store data in the nonvolatile memory device 1230 or transmit data stored in the nonvolatile memory device 1230 to the host 1100 in response to a request from the host 1100.

The nonvolatile memory device 1230 may store data or transmit stored data to the host 1100 under the control of the storage controller 1210. In an example embodiment, the nonvolatile memory device 1230 may be a NAND flash memory device, but example embodiments are not limited thereto. In an example embodiment, the host 1100 and the storage device 1200 may exchange data with each other through an interface channel.

Hereinafter, for convenience of description, the term 'Performance' or 'Quality of Service (QoS)' of the storage device 1200 is used. Unless otherwise indicated, 'performance' of the storage device 1200 may indicate an amount of data per unit time or a data transmission speed transmitted between the storage device 1200 and the host 1100. 'Performance' of the storage device 1200 may be expressed using various indicators such as random read, random write, sequential write, or sequential read. 'Quality of Service (QoS)' also may also to the quality of a service provided by the storage device 1200 (in particular, a write operation), an in this regard has a meaning similar to 'performance'.

The storage controller 1220 includes a throttler 1220 for performance consistency. The throttler 1220 is a component for improving quality of service QoS by intentionally delaying transmission of a completion message (Completion) to the host 1100 for a write command CMD. When the write command CMD is received, the storage device 1200 temporarily stores write data in the buffer 1250 and then programs the write data in the nonvolatile memory device 1230. For example, the buffer 1250 may include a plurality of write buffers and the write data may be temporarily stored in one of the plurality of write buffers and then programmed in the nonvolatile memory device 1230. The storage controller 1210 transmits a completion message (Completion) to the host 1100 when the write data is stored in the buffer 1250. According to this processing method, write latency may be determined at a point in time when write data is written to the buffer 1250 instead of the nonvolatile memory device 1230. Therefore, from the viewpoint of the host 1100, because the completion message (Completion) can be received before write data is programmed into the nonvolatile memory device 1230, faster write performance can be perceived.

Under various circumstances, the performance of the storage device 1200 may not be constant. For example, depending on physical characteristics of the nonvolatile memory device 1230 or various environmental variables (e.g., buffer memory size, available memory capacity in the nonvolatile memory device, etc.), operation completion times for the same write request may be different. This difference in operation completion times may cause performance fluctuation of the storage device 1200. That is, performance fluctuations may occur in the storage device 1200 according to various environmental variables.

As the workload of the storage device 1200 increases, the processing speed of the write command may be slower than the requested speed. If this situation continues, a situation may occur in which the capacity of the buffer 1250 to store a write command is exhausted. In this case, processing of the write command is delayed until the requested write command is processed and the write buffer is returned. In this regard, a write speed perceived by the host 1100 is decreased. In order to prevent such a problem, the storage device 1200 monitors the plurality of write buffers of the buffer 1250 or an internal operating state to determine whether there is sufficient overhead for a write operation. In addition, the storage device 1200 uses a policy of intentionally delaying generation time (hereinafter referred to as throttling delay time) of a completion message (Completion) for write commands according to whether or not the determination is made. This feature may be referred to as write throttling. For write throttling, the storage controller 1210 includes a throttler 1220.

The throttler 1220 may perform write throttling to provide uniform performance. In related devices, throttling has been performed according to predetermined conditions according to previous characteristics in various situations. In this regard, the throttling delay time (hereinafter referred to as TDT) is determined according to an algorithm composed of complex branches and constants.

Throttling delay time TDT directly affects the perceived performance of the host 1100. Estimating the appropriate throttling delay time TDT for a particular workload is critical for performance. However, the optimal throttling delay time TDT for each workload is different. Therefore, in order to empirically set the throttling delay time TDT suitable for the workload, repeated experiments and trial errors are required. In addition, the unoptimized throttling delay time TDT wastes the resources of the storage device 1200 unnecessarily, and the firmware code for setting the throttling delay time TDT increases the complexity of the algorithm.

The throttler 1220 according to an example embodiment calculates an optimal throttling delay time TDT according to a workload based on machine learning. The machine learning model may be implemented by the throttler 1220 and may provide an optimal throttling delay time TDT according to the workload or state of the storage device 1200. The throttler 1220 may be configured with a machine learning model that provides an optimal throttling delay time TDT according to the workload or state of the storage device 1200. Accordingly, the throttler 1220 provides a throttling delay time TDT according to the workload and state of the storage device 1200. Then, the storage controller 1210 transmits a completion message (Completion) to the host 1100 according to the throttling delay time TDT generated based on machine learning. For example, the completion message (Completion) may be transmitted to the host 1100 at a time that is offset by the throttling delay time TDT from when data is stored in the buffer.

The weight of the throttler 1220 is learned by a separately provided weight learning device 1300. The weight learning device 1300 executes supervised machine learning using the performance of the storage device 1200 as an input and the weight of the throttler 1220 as an output. In particular, the weight learning device 1300 accumulates and learns performance according to weight values of the throttler 1220 under various workloads and states occurring during operation of the storage device 1200 without separately provided label data. That is, performance information collected during operation of the storage device 1200 is used as label data of the weight learning device 1300.

The weight learning device 1300 generates an objective function optimized for the throttler 1220 using the accumulated weights and performance. That is, the weight learning device 1300 generates an objective function for predicting weights according to performance. Weights for providing optimal or highest performance are selected from the generated objective function, and the machine learning model of the throttler 1200 may be updated by the selected weights.

The weight learning device 1300 may be implemented as a separate device from the storage device 1200. The weight learning device 1300 may be a computing device or a processing device that includes one or more processors and one or more memories, receives performance information from the storage device 1200 to perform machine learning and outputs the weight of the throttler 1220 as a result.

The nonvolatile memory device 1230 may store data received from the storage controller 1210 or transmit stored data to the storage controller 1210 under the control of the storage controller 1210. The nonvolatile memory device 1230 may include a plurality of memory blocks. Each of the plurality of memory blocks has a 3D memory structure in which word line layers are stacked in a direction perpendicular to the substrate. Each of the plurality of memory blocks may be managed by the storage controller 1210 through wear leveling information such as an erase count.

The buffer 1250 provides a buffering function between the host 1100 and the nonvolatile memory device 1230. For example, when a write command and write data are provided, the write data is preferentially stored in the buffer 1250. At this time, when the write data is stored in the buffer 1250, a completion message (Completion) for the write request is generated. In particular, the throttler 1220 transmits the completion message (Completion) according to the throttling delay time TDT in order to optimize performance. For example, the throttle 1220 may control the completion message (Completion) to be transmitted to the host 1100 at a time that is offset by the throttling delay time TDT from when data is stored in the buffer 1250. The buffer 1250 may also provide a buffering function for providing various direct memory access DMA functions. The buffer 1250 may be implemented with a relatively large-capacity DRAM in consideration of performance.

As described above, the storage system 1000 according to an example embodiment includes the storage device 1200 that identifies a throttling delay time TDT by learning weights to provide optimal performance without supplying label data. The throttling delay time TDT setting of the storage device 1200 performed depending on empirical knowledge may be automatically implemented by a machine learning model. Therefore, according to example embodiments, it is possible to provide a storage device which sets an optimal throttling latency for each workload or state.

Figure 2:
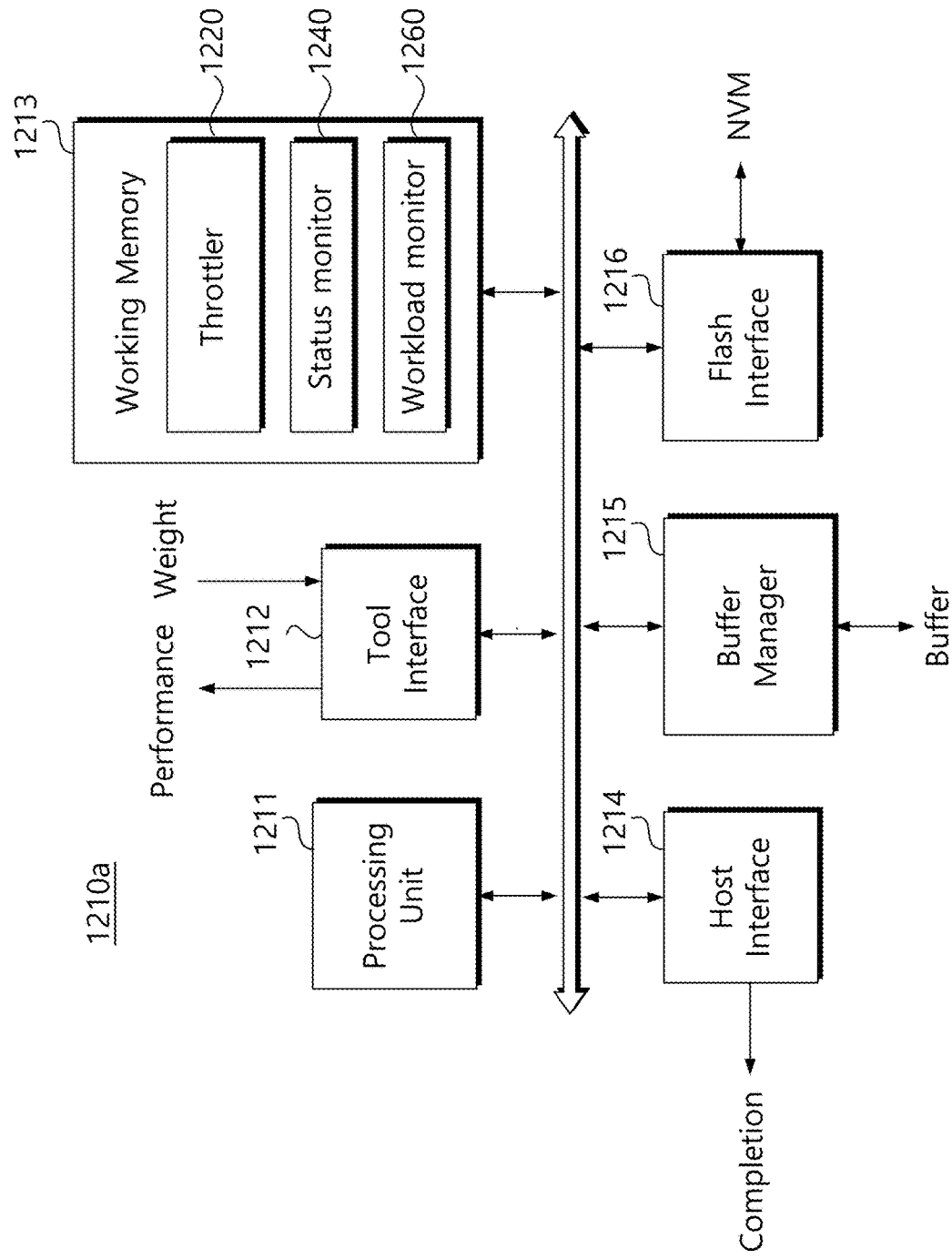
FIG. 2 is a block diagram of the storage controller of FIG. 1 according to an example embodiment.

FIG. 2 is a block diagram showing configuration of the storage controller of FIG. 1 according to an example embodiment. Referring to FIG. 2, a storage controller 1210a includes a processing unit (e.g., processor) 1211, a tool interface 1212, a working memory 1213, a host interface 1214, a buffer manager 1215, and a flash interface 1216. However, it will be understood that the components of the storage controller 1210a are not limited to the aforementioned components. For example, the storage controller 1210a may further include a read only memory ROM or an error correction code block for storing code data necessary for a booting operation.

The processing unit 1211 may include a central processing unit or a micro-processor. The processing unit 1211 may drive software or firmware for driving the storage controller 1210. In particular, the processing unit 1211 may drive software loaded into the working memory 1213. For example, processing unit 1211 may execute throttler 1220, status monitor 1240, and workload monitor 1260. In addition, the processing unit 1211 may execute core functions of the storage device 1200 such as a flash translation layer FTL.

The tool interface 1212 interfaces with the weight learning device 1300 provided separately from the storage device 1200. The tool interface 1212 provides an interface for direct communication between the storage controller 1210 and the weight learning device 1300. In particular, the tool interface 1212 may be used for transmitting performance information to the weight learning device 1300 and receiving weights from the weight learning device 1300. The tool interface 1212 may be configured as a general purpose input output GPIO interface capable of exchanging analog or digital signals. However, the tool interface 1212 may employ at least one of communication methods such as I2C, UART, SPI, and SMBus.

Software (or firmware) or data for controlling the storage controller 1210a is loaded into the working memory 1213. Software and data loaded into the working memory 1213 are executed or processed by the processing unit 1211. In particular, according to an example embodiment, the throttler 1220, the status monitor 1240, and the workload monitor 1260 may be loaded into the working memory 1213. Alternatively, a flash translation layer FTL including functions of the throttler 1220, the status monitor 1240, and the workload monitor 1260 may be loaded. The working memory 1213 may be implemented with, for example, SRAM.

The throttler 1220 driven by the processing unit 1211 may be implemented as a software module. The weight of the machine learning model included in the throttler 1220 may be provided from the weight learning device 1300 via the tool interface 1212. The throttler 1220 calculates an optimal throttling delay time TDT according to the workload and state of the storage device 1200 based on machine learning. Status information of the storage device 1200 may be provided from the status monitor 1240. In addition, workload information of the storage device 1200 may be provided from the workload monitor 1260.

The status monitor 1240 collects status information of the storage device 1200 and provides it to the throttler 1220. The state information may include, for example, information such as a write amplification factor WAF used to perform throttling. The write amplification factor WAF may be a value obtained by dividing the size of data written in the memory area by the size of data requested from the host 1100. The storage device may write more data than data requested by the host for additional operations such as garbage collection. The smaller the size of the write amplification factor WAF may indicate that the storage device 1200 has more resources. In general, the size of the write amplification factor WAF cannot be smaller than '1'.

The workload monitor 1260 collects workload information of the storage device 1200 and provides it to the throttler 1220. The workload information may include, for example, the number of write buffers in use of the storage device 1200, a write ratio WR, and a queue depth. The number of buffers in use indicates the number of buffers in use in the current write buffer that has received a write command. The write ratio WR indicates a ratio of write and read among input/output of the storage device 1200. Further, queue depth indicates information on the size of a queue to be executed by the storage device 1200. Here, although the state information and the workload information are separately expressed, it will be understood that the state information and the workload information may also include factors for expressing the current performance or state of various storage devices 1200.

The host interface 1214 provides an interface between the host 1100 and the storage controller 1210a. The host 1100 and the storage controller 1210a may be connected through one of various standardized interfaces. Here, the standard interfaces include Advanced Technology Attachment (ATA), Serial ATA (SATA), external SATA (e-SATA), Small Computer Small Interface (SCSI), Serial Attached SCSI (SAS), Peripheral Component Interconnection (PCI), PCI Express (PCIe), Universal Serial Bus (USB), IEEE 1394, Universal Flash Storage (UFS), Embedded Multi Media Card (eMMC), Nonvolatile Memory Express (NVMe), NVM Express over Fabrics (NVMe-of), and NVMe Management Interface (NVMe-MI).

The buffer manager 1215 controls read and write operations of the buffer 1250 (see FIG. 1). For example, the buffer manager 1215 temporarily stores write data or read data in the buffer 1250. The buffer manager 1215 may divide and manage the memory area of the buffer 1250 according to the control of the processing unit 1211.

The flash interface 1216 provides an interface between the storage controller 1210a and the nonvolatile memory device 1230. For example, data processed by the processing unit 1211 is stored in the nonvolatile memory device 1230 through the flash interface 1216. As another example, data stored in the nonvolatile memory device 1230 may be transferred to the storage controller 1210a through the flash interface 1216.

Configurations of the storage controller 1210a described above as an example have been described. According to the functions of the storage controller 1210a, an example embodiment in which the throttler 1220, the status monitor 1240, and the workload monitor 1260 are implemented in software or firmware has been described. However, the throttler 1220, the status monitor 1240, and the workload monitor 1260 may be implemented in hardware. Such an example will be described with reference to FIG. 3 to be described later.

Figure 3:
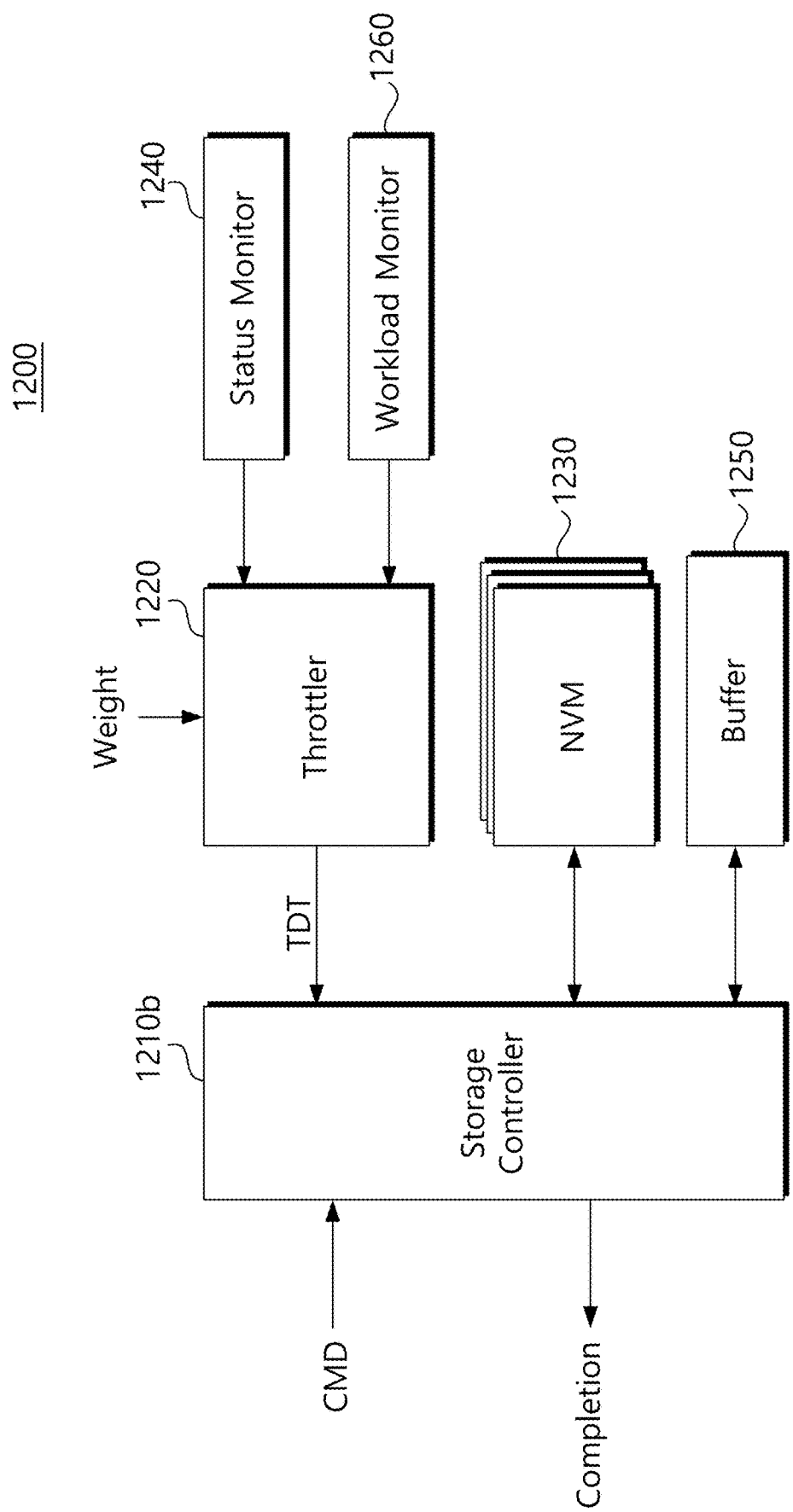
FIG. 3 is a block diagram of the storage device of FIG. 1 according to another example embodiment.

FIG. 3 is a block diagram of the storage device of FIG. 1 according to another example embodiment. Referring to FIG. 3, the throttler 1220, the status monitor 1240, and the workload monitor 1260 may be implemented by hardware rather than software or firmware. It will be understood that the throttler 1220, the status monitor 1240, and the workload monitor 1260 may be located outside of the storage controller 1210b, but may also be included as internal components of the storage controller 1210b. Because the nonvolatile memory device 1230 and the buffer 1250 are substantially the same as those of FIG. 1, a description thereof will be omitted.

The throttler 1220 receives weights provided from the weight learning device 1300. The throttler 1220 calculates an optimal throttling delay time TDT according to the workload and state of the storage device 1200 based on machine learning. Based on the throttling delay time TDT, the storage controller 1210b adjusts the transmission time of the completion message. For example, the completion message (Completion) may be transmitted to the host 1100 at a time that is offset by the throttling delay time TDT from when data is stored in the buffer. Status information of the storage device 1200 may be provided from the status monitor 1240. In addition, workload information of the storage device 1200 may be provided from the workload monitor 1260.

The status monitor 1240 collects status information of the storage device 1200 and provides it to the throttler 1220. State information may include information such as a write amplification factor WAF. The write amplification factor WAF may be a value obtained by dividing the size of data written in the memory area by the size of data requested from the host 1100.

The workload monitor 1260 collects workload information of the storage device 1200 and provides it to the throttler 1220. The workload information may include, for example, the number of write buffers in use of the storage device 1200, a write ratio WR, and queue depth.

In the above, an example in which the throttler 1220, the status monitor 1240, and the workload monitor 1260 are implemented in hardware has been briefly described. However, it will be appreciated that the throttler 1220, status monitor 1240, and workload monitor 1260 may be implemented in various combinations of hardware or software.

Figure 4:
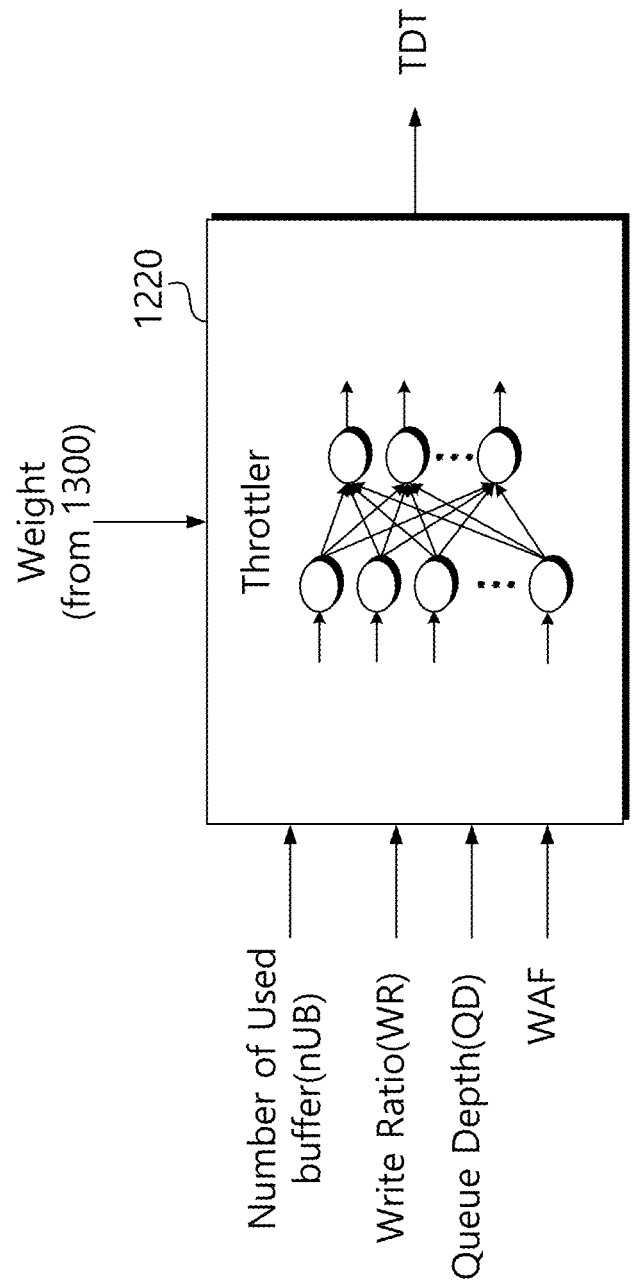
FIG. 4 is a block diagram showing characteristics of a throttler according to an example embodiment.

FIG. 4 is a block diagram briefly showing characteristics of a throttler according to an example embodiment. Referring to FIG. 4, the throttler 1220 may calculate a throttling delay time TDT by processing workload information and state information. At this time, the weight of the machine learning model constituting the throttler 1220 is supplied by the weight learning device 1300.

The throttler 1220 calculates the optimal throttling delay time TDT according to the workload based on machine learning. The throttler 1220 may be configured with a machine learning model having a neural network structure that calculates an optimal throttling delay time TDT according to the workload or state of the storage device 1200. The storage controller 1210 transmits a completion message to the host 1100 according to the calculated throttling delay time TDT.

When the machine learning model of the throttler 1220 is initially driven, learning may proceed in a random weight state. Alternatively, the machine learning model of the throttler 1220 may be initialized with an initial weight value previously determined by the user to start learning. When weights and performance histories are gradually accumulated, weight learning values in the weight learning device 1300 will converge to weights capable of calculating an optimal throttling delay time TDT. When learning by the weight learning device 1300 is completed, the throttler 1220 may be updated with an optimal weight at that time.

An algorithm for generating the throttling delay time TDT of the throttler 1220 may be expressed by Equation 1 below.

$$f(x;w) = w_1 x_1 + w_2 x_2 + w_3 x_3 + w_4 x_4 + b \qquad \text{[Equation 1]}$$

Here, '$w_i$' represents a weight set of the machine learning model of the throttler 1220. And '$x_i$' indicates input state information or input workload information to the throttler 1220. For example, '$x_1$' corresponds to the number of write buffers (nUB), '$x_2$' is the write rate WR, '$x_3$' is the queue depth QD, and '$x_4$' is the write amplification factor WAF. And 'b' represents a constant. Calculation of the output value of the throttler 1220 expressed in Equation 1 can be implemented with one line of code. Accordingly, the code size can be dramatically reduced compared to codes composed of branching statements and constant values of hundreds or thousands of lines for obtaining an optimal throttling delay time TDT by empirically set values.

Figure 5:
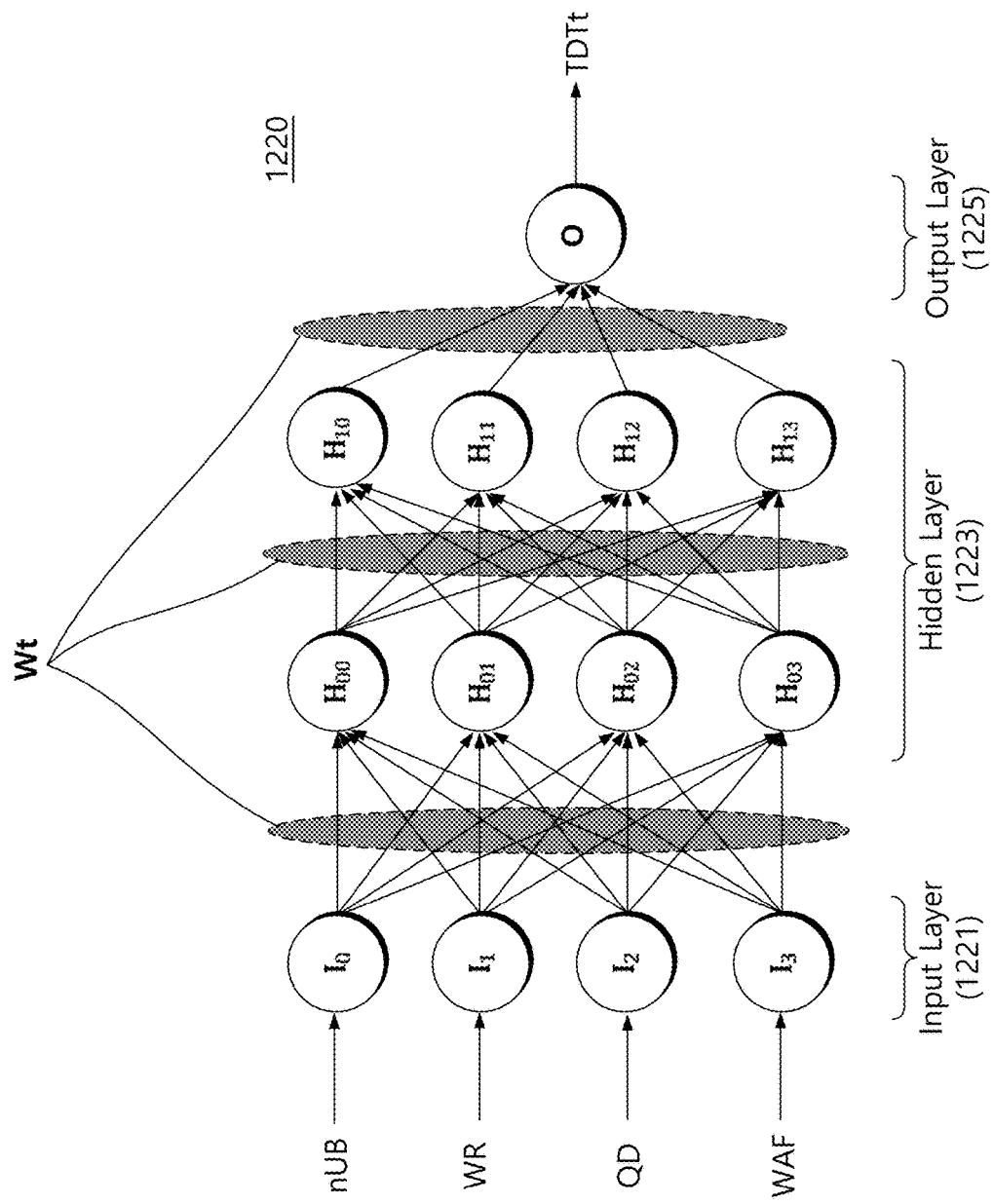
FIG. 5 is a diagram showing a machine learning model of the throttler of FIG. 4 according to an example embodiment.

FIG. 5 is a diagram showing a machine learning model of the throttler of FIG. 4 according to an example embodiment. Referring to FIG. 5, the machine learning model of the throttler 1220 takes the number of write buffers nUB, write ratio WR, queue depth QD, and write amplification factor WAF values as inputs and calculates the throttling delay time TDT. The machine learning model may include an input layer 1221, one or more hidden layers 1223, and an output layer 1225.

Input features of the throttler 1220 are provided to the nodes $I_0$ to $I_3$ constituting the input layer 1221. The input feature may be state information or workload information of the storage device 1200 described above. The input features may be, for example, the number of write buffers nUB, write ratio WR, queue depth QD, and write amplification factor WAF. In addition, a bias corresponding to the constant 'b' of Equation 1 may be added as an input feature.

To the hidden layer 1223, an input feature value received from the input layer 1221 is multiplied by a weight and transmitted. Here, the weight indicates a connection strength between each of the nodes $I_0$ to $I_3$ of the input layer 1221 and each of the nodes $H_{00}$ to $H_{03}$ of the first layer of the hidden layer 1223. The first layer nodes $H_{00}$ to $H_{03}$ of the hidden layer 1223 add the features that are multiplied with weights and transferred, and the summed value is processed according to a predefined activation function. A value output by the activation function is transmitted after being multiplied by a weight to each of the nodes $H_{10}$ to $H_{13}$ of the second hidden layer 1223. The input feature processed in this way is passed to the output layer 1225 and the node O of the output layer 1225 can generate the current throttling delay time TDTt.

The performance of the machine learning model of the throttler 1220 is determined by a weight 'Wt' representing the connection strength between nodes. The throttler 1220 will generate a throttling delay time TDTt using a random set of weights in its initial operation. However, when weights and performance histories in the weight learning device 1300 are accumulated, the weights gradually converge to an optimal value. In addition, when a weight that reaches an appropriate level of performance or higher is generated, the throttler 1220 may be updated with the corresponding weight set.

In the above, an example of a machine learning model for implementing the throttler 1220 has been briefly described. The machine learning model of the throttler 1220 does not need to perform separate weight training. This is because the optimal weight of the throttler 1220 is learned and updated by the weight learning device 1300. It will be appreciated that the machine learning model implementing the throttler 1220 is not limited to the illustrated example and can be implemented in a variety of ways.

Figure 6:
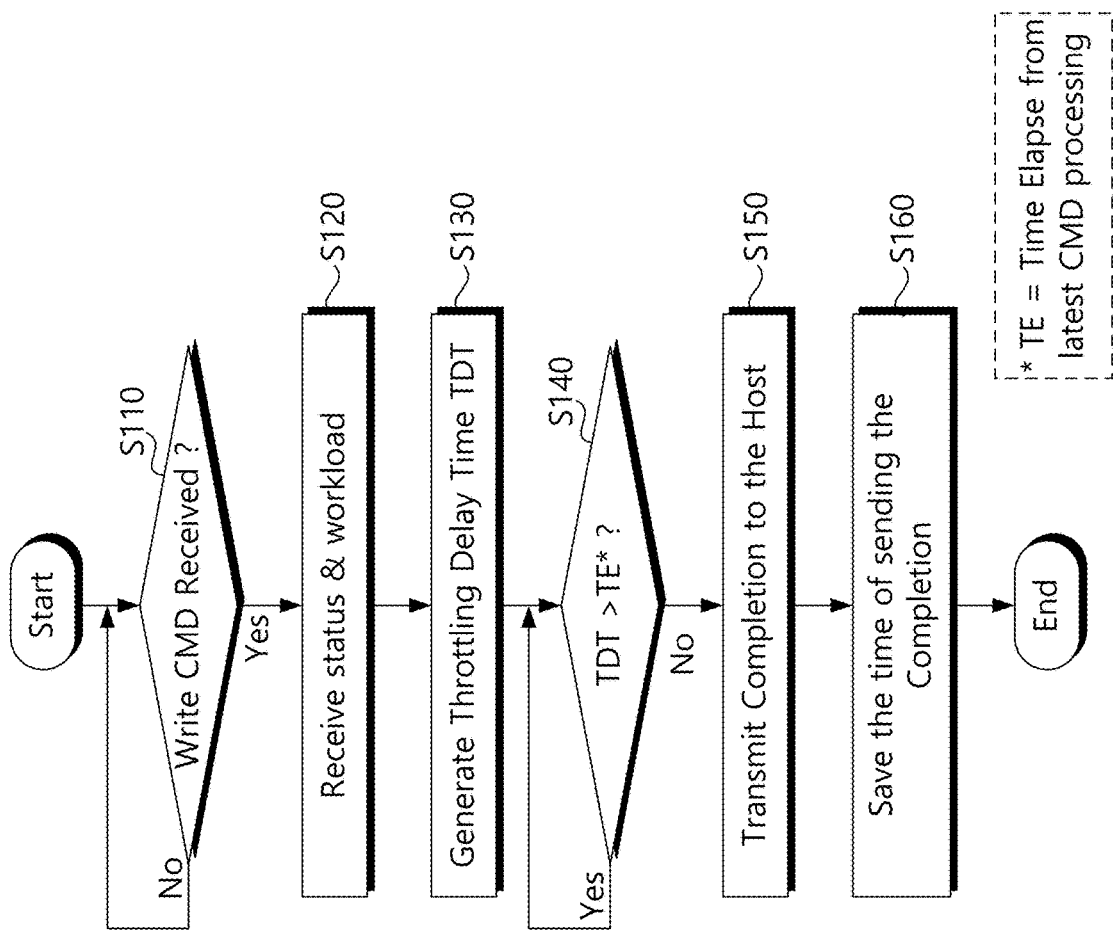
FIG. 6 is a flowchart showing a method of operating a throttle according to an example embodiment.

FIG. 6 is a flowchart showing a method of operating a throttle according to an example embodiment. Referring to FIG. 6, when a write request is transmitted, the throttler 1220 or the storage controller 1210 generates a throttling delay time TDT and transmits completion message to the write request according to the generated throttling delay time TDT.

In operation S110, the storage controller 1210 monitors reception of the write command. If it is determined that the write command is received ('Yes'), the process moves to operation S120. On the other hand, if it is determined that the write command has not yet been received ('No'), the storage controller 1210 continuously monitors whether or not the write command has been received.

In operation S120, the throttler 1220 receives workload information and status information of the storage device 1200. Workload information may be provided from the workload monitor 1260 and status information may be provided from the status monitor 1240. State information may include a write amplification factor WAF used to perform throttling. The workload information may include at least one of the number of write buffers in use nUB, a write ratio WR, and a queue depth QD.

In operation S130, the throttler 1220 calculates an optimal throttling delay time TDT based on the workload and state information of the storage device 1200.

In operation S140, the storage controller 1210 compares a throttling delay time TDT generated based on the current workload and state with an elapsed time TE from the command processing point to the current point in time. If the throttling delay time TDT is greater than the elapsed time TE ('Yes'), the procedure waits until the elapsed time TE reaches the throttling delay time TDT. On the other hand, if the throttling delay time TDT is not greater than the elapsed time TE ('No'), the procedure moves to operation S150 for transmitting a completion message.

In operation S150, the storage controller 1210 transmits a completion message to the host 1100.

In operation S160, the storage controller 1210 stores the time when the completion message is transmitted. The transmission point of the stored completion message will be used for calculating the elapsed time TE used in operation S140 or various performance calculations.

The throttler 1220 described above has the form of a machine learning model, but may not include a function of directly updating weights. Updating the weights will be entirely handled by the weight learning device 1300 to be described later.

Figure 7:
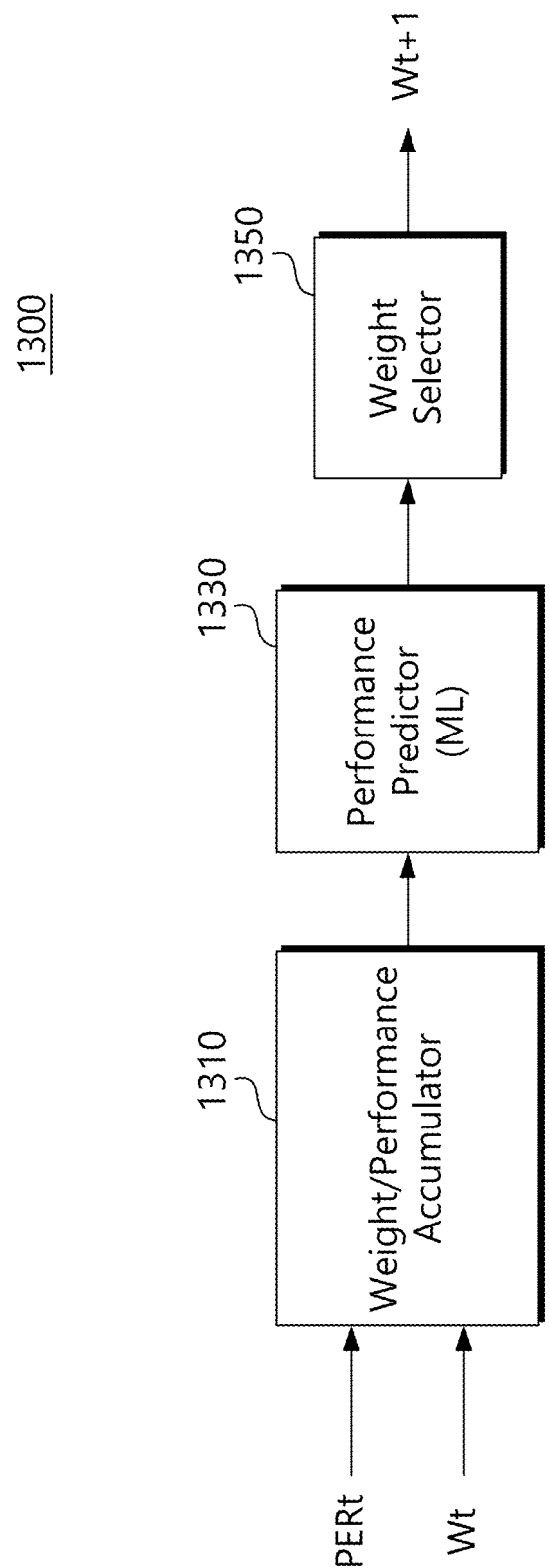
FIG. 7 is a block diagram showing the configuration of the weight learning apparatus.

FIG. 7 is a block diagram briefly showing the configuration of the weight learning device. For example, the weight learning device 1300 may include one or more processors. Referring to FIG. 7, the weight learning device 1300 is a component dedicated to learning the weight of the throttler 1220. The weight learning device 1300 includes a weight/performance accumulator 1310, a performance predictor 1330, and a weight selector 1350. The weight learning device 1300 may be implemented with various development tools or devices implemented outside the storage device 1200. For example, the weight/performance accumulator 1310, the performance predictor 1330, and the weight selector 1350 may be controlled by the one or more processors of the weight learning device 1300

The weight/performance accumulator 1310 receives and stores the current weight Wt from the throttler 1220 and performance information PERt measured in the host 1100. When the current weight Wt is accumulated in the weight/performance accumulator 1310, all histories of the weight Wt updated according to the progress of learning from the initial weight set as a random value in the throttler 1220 are all stored. Also, performance information PERt corresponding to each of the weights will be stored. The weight/performance information accumulated in the weight/performance accumulator 1310 increases over time.

As an example, the function f(A, B, C) for providing the performance information PERt may be calculated as in Equation 2 below.

$$f(A, B, C) = \frac{1}{n}\sum_{i=1}^{n} \frac{1}{3}\left\{100\tau_1\left(\frac{A_i}{a} - 1\right) + 100\tau_2\left(1 - \frac{B_i}{b}\right) + 100\tau_3(C_i - c)\right\}$$ [Equation 2]

The function f(A, B, C) may be expressed as a weighted average function of throughput, quality of service (QoS), consistency, and the like. Here, 'Ai' indicates the current throughput for the workload (i), and 'a' represents the throughput specification. 'Bi' indicates the current quality of service QoS for the workload (i), and 'b' represents the quality of service QoS specification. 'Ci' indicates the current consistency for the workload (i), and 'b' indicates the consistency specification. 'τ' indicates the weight of each performance indicator. A function for calculating the performance information PERt may be defined in various ways, and it will be understood that the function is not limited to Equation 2 described above.

The performance predictor 1330 may apply a methodology for finding weights that provide maximum performance through learning from a machine learning model. For example, the performance predictor 1330 may apply a Bayesian Optimization Surrogate Model that generates an unknown objective function from accumulated weight/performance information. However, it will be understood that the Bayesian Optimization Surrogate Model technology is only an example, and that various methodologies based on machine learning may be applied. The performance estimator 1330 constructs an objective function by mapping the weight as an input value and the performance as an output value. The accuracy of the objective function increases as the amount of accumulated weight/performance information increases. Therefore, the prediction accuracy of the weights that can provide maximum performance will increase as learning progresses.

The weight selector 1350 selects a weight Wt+1 corresponding to the maximum performance from the objective function generated based on information accumulated up to the current weight Wt. The selected weight Wt+1 will be provided to the throttler 1220 to update the current weight Wt.

Operating characteristics of the weight learning device 1300 have been described. The weight learning device 1300 enables learning of a weight set corresponding to maximum performance of the throttler 1220 without artificial label data.

Figure 8:
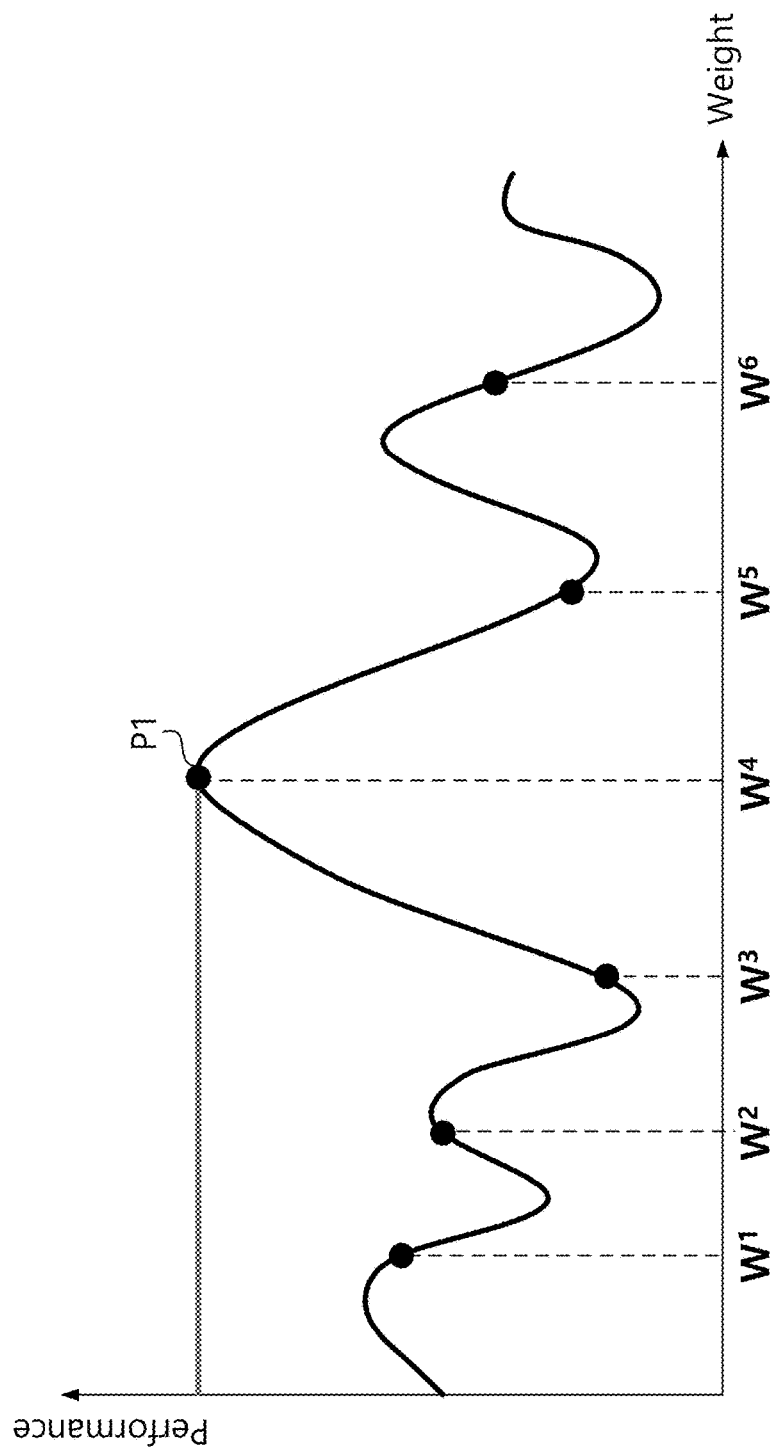
FIG. 8 is a graph showing an objective function predicted by the performance predictor of FIG. 7 as an example.

FIG. 8 is a graph showing an objective function predicted by the performance predictor of FIG. 7 as an example. Referring to FIG. 8, learning of the weight learning device 1300 occurs in a method of probabilistically estimating an unknown objective function in a performance predictor 1330. Here, the objective function is shown as a two-dimensional function of weight and performance, but this is simply expressed for convenience of explanation. The objective function can be implemented in many different dimensions.

The label data of supervised learning in the performance predictor 1330 is the performance obtained by the set weight. That is, the input data of the performance predictor 1330 is the weight of the throttler 1220, and the label data is the performance measured when the corresponding weight is applied to the throttler 1220. Performance can be measured while the storage device 1200 is operating, and the measured performance information can be transmitted to the weight learning device 1300.

An objective function of the illustrated form may be configured by weight/performance information accumulated in the weight/performance accumulator 1310. Here, each of the weights $W^1$, $W^2$, $W^3$, $W^4$, $W^5$, and $W^6$ indicates the entire set of weights of the machine learning model of the throttler 1220 at a certain point in time. The performance estimator 1330 may estimate the performance corresponding to the weights $W^1$, $W^2$, $W^3$, $W^4$, $W^5$, and $W^6$ provided discretely or randomly using the Bayesian Optimization Surrogate Model.

In an example embodiment, for learning of the performance predictor 1330, the same workload may be repeatedly applied to the storage device 1200, and the performance predictor 1330 may learn a relationship between the weight of the throttler 1220 and the performance. If the objective function between the weight and the performance of the machine learning model learned by the performance predictor 1330 is correct, the highest point of the objective function may be the optimal weight of the model.

In another example embodiment, learning of the performance predictor 1330 may be performed at runtime of the storage device 1200. For various workloads provided from the host 1100 in a mounting environment, the performance predictor 1330 may learn a relationship between the weight and performance of the throttler 1220. That is, the performance predictor 1330 may be trained in response to a workload occurring in real time in an actual use environment of the storage device 1200. Therefore, the initial value of the weight of the throttler 1200 is not accurate in the beginning, so the accuracy of the objective function of the performance predictor 1330 will not be high. However, the greater the amount of accumulated weight/performance information, the higher the accuracy of the objective function and the more accurate the predicted weight value.

If the objective function defining the relationship between the weight and performance of the machine learning model is accurate, the weight $W^4$ corresponding to the highest point P1 of the objective function is selected as the optimal weight of the throttler 1220 providing the maximum performance.

Figure 9:
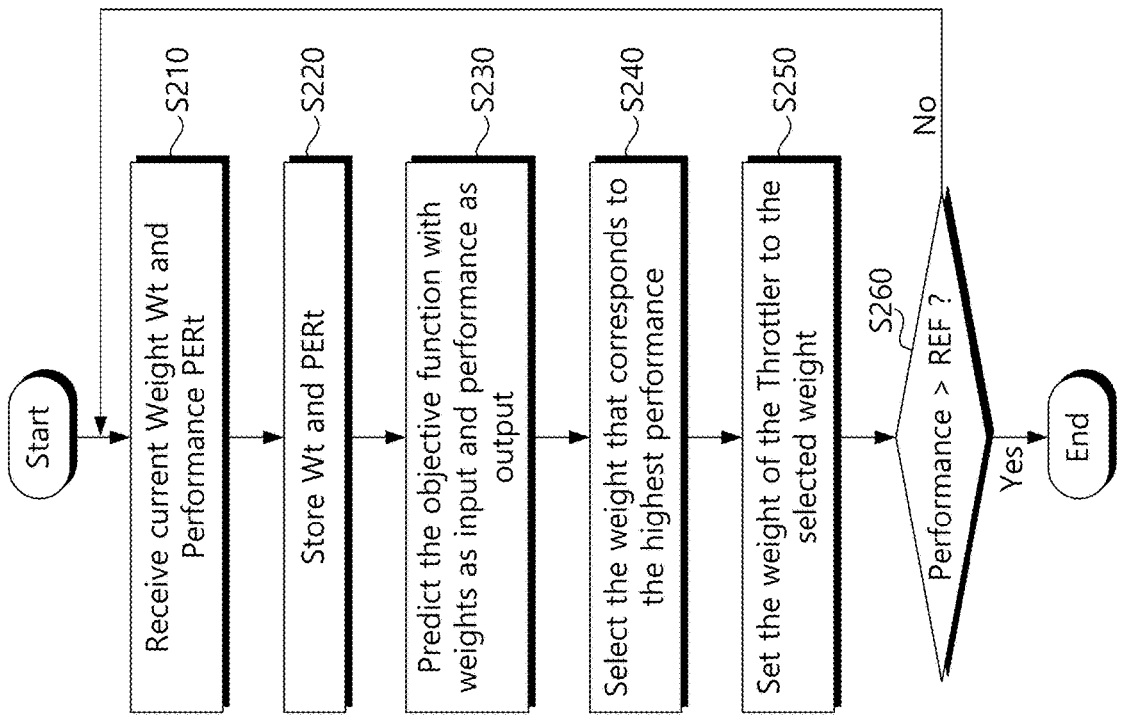
FIG. 9 is a flowchart showing a learning method according to an example embodiment.

FIG. 9 is a flowchart of a learning method according to an example embodiment. Referring to FIG. 9, the weight learning device 1300 accumulates weights and performance information PERt, and constructs an objective function based on the accumulated information. Further, the weight learning device 1300 may select a weight corresponding to the maximum performance based on the generated objective function and provide the selected weight to the throttler 1220.

In operation S210, the weight learning device 1300 receives the weight Wt of the throttler 1220 and the performance information PERt of the storage device 1200 at the current time. The performance information PERt of the storage device 1200 may be calculated through Equation 2 described above.

In operation S220, the received current weight Wt and performance information PERt are stored in the weight/performance accumulator 1310. For example, it is assumed that previously accumulated weights Wt and performance information PERt sufficiently exist in the weight/performance accumulator 1310 before the current weight Wt and performance information PERt are stored.

In operation S230, the performance predictor 1330 generates an objective function defining the relationship between the performance PER and the weight W. That is, the performance predictor 1330 estimates an objective function having weights as inputs and performance as outputs.

In operation S240, the weight selector 1350 selects a weight Wt+1 corresponding to the maximum performance based on an objective function defining a relationship between the performance PER and the weight W.

In operation S250, the storage controller 1210 updates the weight of the machine learning model included in the throttler 1220 using the weight Wt+1 provided from the weight learning device 1300. Then, the throttler 1220 will calculate the throttling delay time TDT corresponding to the updated weight Wt+1.

In operation S260, performance due to the result of the throttling operation controlled by the updated weight Wt+1 in the throttler 1220 is measured. Performance at this time can be calculated using the parameters of Equation 2. If the calculated performance exceeds the reference value REF ('Yes'), the weight update of the throttler 1220 may end. On the other hand, if the calculated performance is not greater than the reference value (REF) ('No'), the procedure returns to operation S210 and continues learning for weight update.

In the above, the weight learning procedure in the weight learning device 1300 has been briefly described. In the weight learning, performance information is provided as label data. Performance information may be easily provided through a calculation procedure such as Equation 2 during operation of the storage device 1200.

Figure 10:
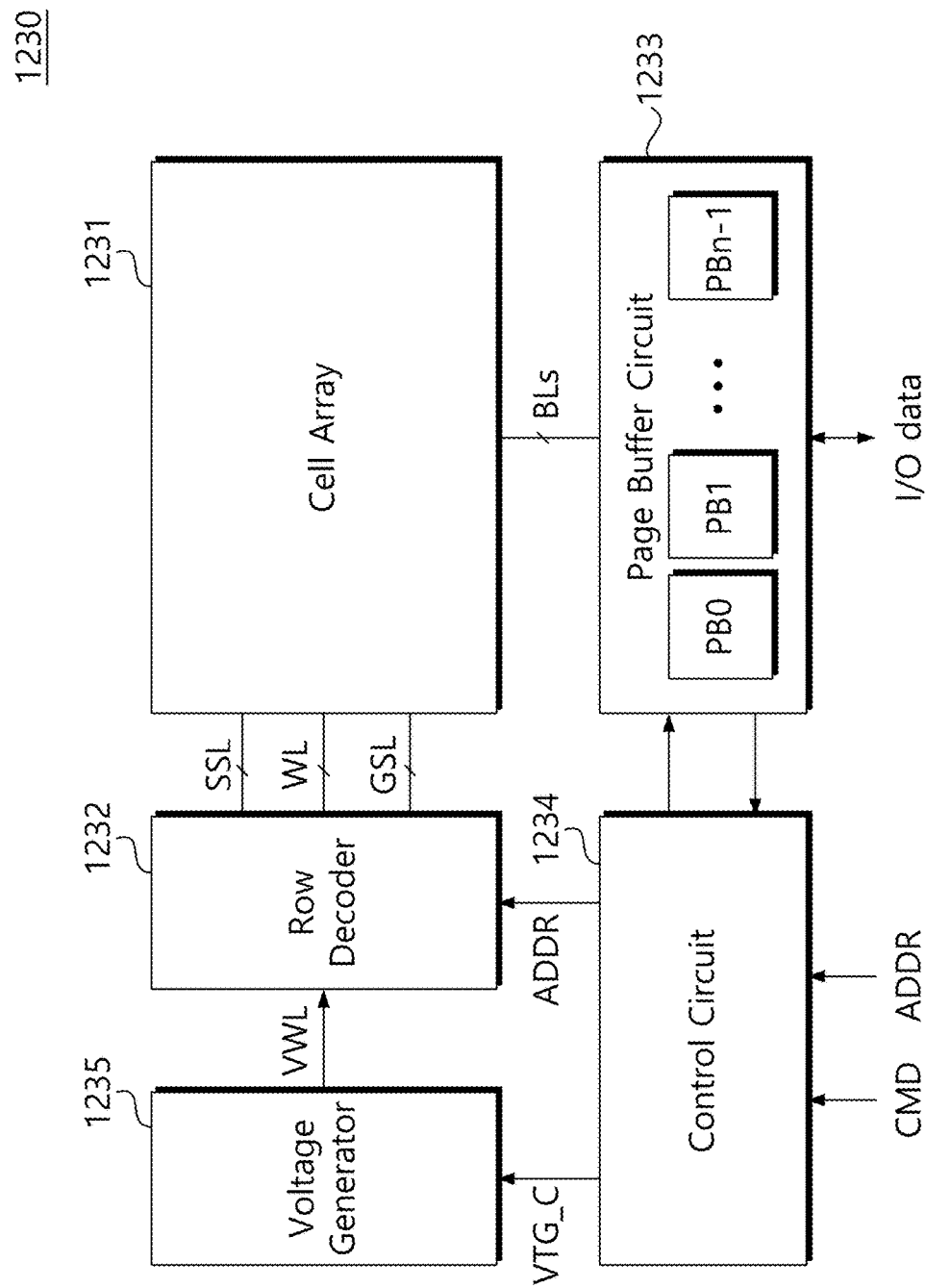
FIG. 10 is a block diagram showing the structure of the nonvolatile memory device of FIG. 1 according to an example embodiment.

FIG. 10 is a block diagram showing the structure of the nonvolatile memory device of FIG. 1 according to an example embodiment. Referring to FIG. 10, a nonvolatile memory device 1230 may include a cell array 1231, a row decoder 1232, a page buffer circuit 1233, a control logic circuit 1234, and a voltage generator 1235. The nonvolatile memory device 1230 may further include a data input/output circuit or an input/output interface. Also, the nonvolatile memory device 1230 may further include elements such as a column selection logic, a pre-decoder, a temperature sensor, a command decoder, and an address decoder.

The cell array 1231 may include a plurality of memory blocks. Each of the plurality of memory blocks may include a plurality of memory cells. A plurality of memory blocks may be included in one memory plane, but example embodiments are not limited thereto. The cell array 1231 may be connected to the page buffer circuit 1233 through bit lines BL, and may be connected to row decoder 1232 through word lines WL, string select lines SSL, and ground select lines GSL. In an example embodiment, the cell array 1231 may include a 3D memory cell array.

The row decoder 1232 may select one of the memory blocks of the cell array 1231 in response to the address ADDR. The row decoder 1232 may select one of the word lines of the selected memory block in response to the address ADDR. The row decoder 1232 transfers the voltage VWL corresponding to the operation mode to the word line of the selected memory block. During a program operation, the row decoder 1232 transfers the program voltage and the verify voltage to the selected word line and the pass voltage to the unselected word line. During a read operation, the row decoder 1232 transfers the read voltage to the selected word line and the read pass voltage to the unselected word line.

The page buffer circuit 1233 may include a plurality of page buffers PB0 to PBn−1. The plurality of page buffers PB0 to PBn−1 may be respectively connected to memory cells through a plurality of bit lines BL. The page buffer circuit 1233 may select at least one bit line from among the bit lines BLs in response to the column address Y-ADDR. The page buffer circuit 1233 may operate as a write driver or a sense amplifier according to an operation mode. For example, during a program operation, the page buffer circuit 1233 may apply a bit line voltage corresponding to data to be programmed to a selected bit line. During a read operation, the page buffer circuit 1233 may sense data stored in a memory cell by sensing a current or voltage of a selected bit line.

The control logic circuit 1234 may generally control various operations within the nonvolatile memory device 1230. The control logic circuit 1234 generates various control signals for programming data into the cell array 1231, reading data from the cell array 1231, or erasing data stored in the cell array 1231, in response to a control signal CTRL, a command CMD, and/or an address ADDR. For example, the control logic circuit 1234 may output a voltage control signal VTG_C, an address ADDR, and the like. In an example embodiment, the control logic circuit 1234 may output control signals for programming multi-bit data according to a received control signal CTRL, command CMD, and/or address ADDR.

The voltage generator 1235 may generate various types of voltages for performing program, read, and erase operations based on the voltage control signal VTG_C. For example, the voltage generator 1235 may generate a program voltage, a read voltage, a program verify voltage, and the like as the word line voltage VWL. For example, the program voltage may be generated in an incremental step pulse program ISPP method.

Figure 11:
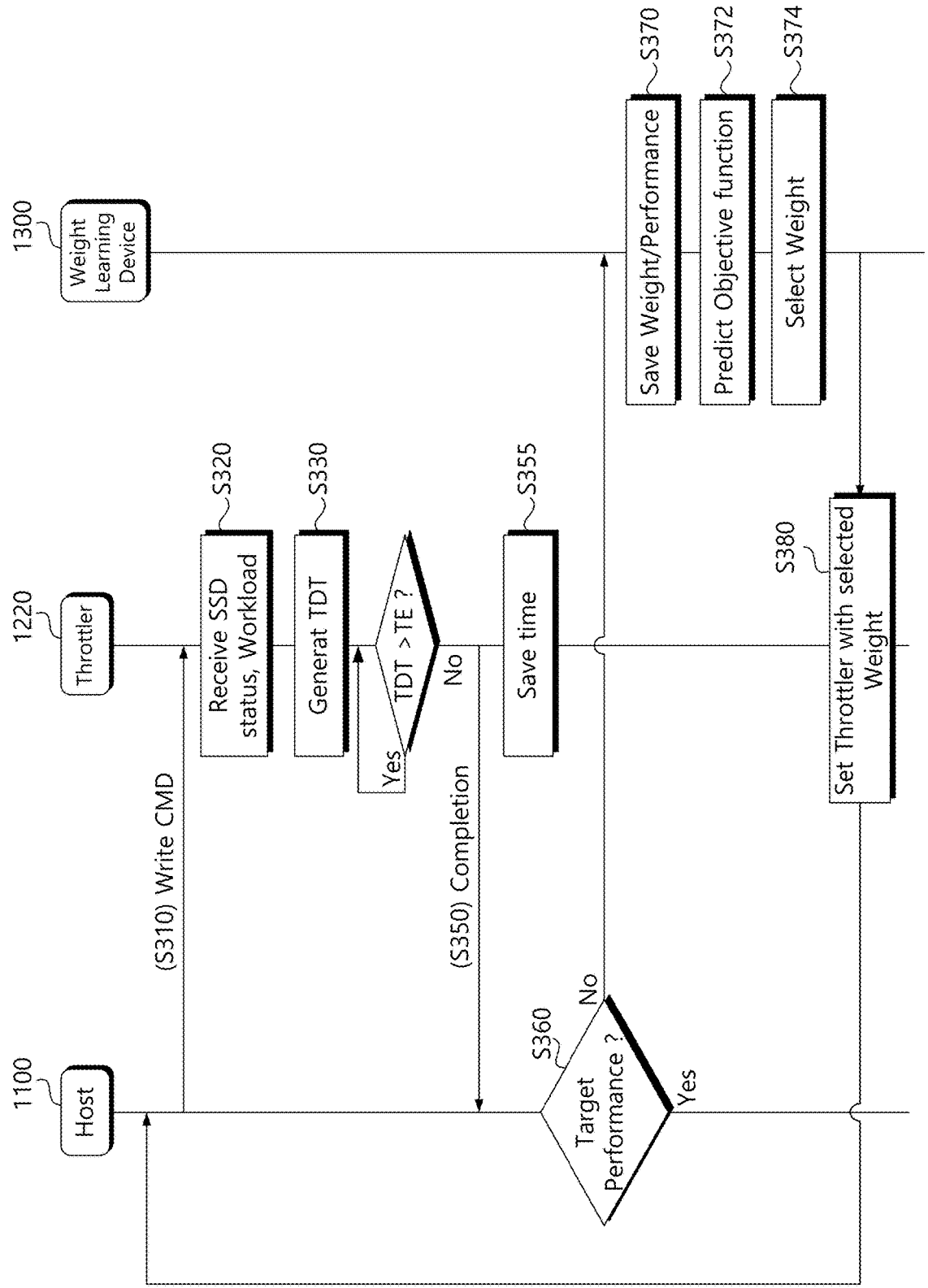
FIG. 11 is a diagram illustrating the process of learning the weight of the throttle according to an example embodiment.

FIG. 11 is a diagram explaining the process of learning the weight of the throttle according to an example embodiment. Referring to FIG. 11, weight learning of the throttler 1200 is performed in the weight learning device 1300.

In operation S310, the host 1100 transmits a write command (Write CMD) to the storage device 1200. Then, the throttler 1220 or the storage controller 1210 of the storage device 1200 receives the write command and starts a procedure for determining the throttling delay time TDT.

In operation S320, the throttler 1220 receives workload information and status information of the storage device 1200. Workload information may be provided from the workload monitor 1260 (see FIG. 2), and status information may be provided from the status monitor 1240 (see FIG. 2). State information may include a write amplification factor WAF used to perform throttling. The workload information may include information such as the number of write buffers in use nUB, a write ratio WR, and a queue depth QD.

In operation S330, the throttler 1220 calculates an optimal throttling delay time TDT based on the workload and state information of the storage device 1200.

In operation S340, the storage controller 1210 compares a throttling delay time TDT generated based on the current workload and state with an elapsed time TE from the last point in time at which the three commands were processed. If the throttling delay time TDT is greater than the elapsed time TE ('Yes'), the procedure waits until the elapsed time TE reaches the throttling delay time TDT. On the other hand, when the throttling delay time TDT is not greater than the elapsed time TE ('No'), the storage controller 1210 moves to operation S350 for transmitting a completion message.

In operation S350, the storage controller 1210 transmits a completion message to the host 1100. In operation S355, the storage controller 1210 stores the transmission time of the completion message.

In operation S360, the host 1100 calculates the performance of the current storage device 1200 based on the completion message. For example, performance can be calculated using the weighted average function of Equation 2 described above. If it is determined that the current performance has reached the target performance ('Yes'), the weight adjustment operation of the throttler 1220 for performance improvement may end. On the other hand, if it is determined that the current performance does not reach the target performance ('No'), the host 1100 transfers the performance information as label data to the weight learning device 1300. The procedure moves to S370 to update the weight of the throttler 1220 for performance improvement.

In operation S370, the weight learning device 1300 receives the current weight Wt of the throttler 1220 and the performance information PERt of the storage device 1200. Also, the received current weight Wt and performance information PERt are stored in the weight/performance accumulator 1310. For example, it is assumed that previously accumulated weights Wt and performance information PERt sufficiently exist in the weight/performance accumulator 1310 before the current weight Wt and performance information PERt are stored.

In operation S372, the performance predictor 1330 generates an objective function defining the relationship between the performance PER and the weight W. That is, the performance predictor 1330 estimates an objective function having weights as inputs and performance as outputs.

In operation S374, the weight selector 1350 selects a weight Wt+1 corresponding to the maximum performance based on an objective function defining a relationship between the performance PER and the weight W.

In operation S380, the throttler 1220 sets the weight of the machine learning model using the weight Wt+1 provided from the weight learning device 1300. Then, the throttler 1220 will calculate the throttling delay time TDT corresponding to the updated weight Wt+1. After that, the process returns to operation S310 and the weight update of the throttler 1220 will occur by a subsequent write command.

In the above, the weight learning procedure in the weight learning device 1300 has been briefly described. In the weight learning, performance information is provided as label data. Performance information may be easily provided through a calculation procedure such as Equation 2 during operation of the storage device 1200.

Figure 12:
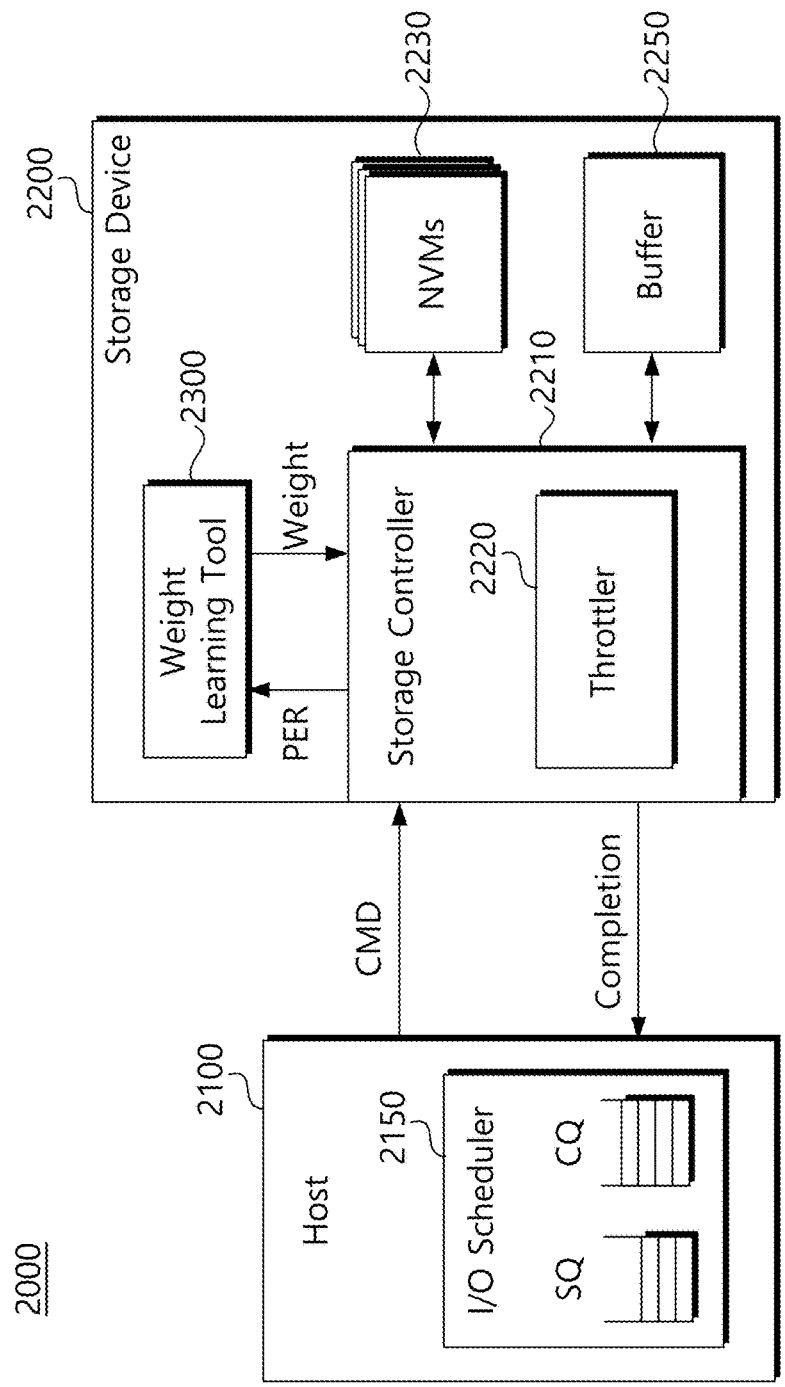
FIG. 12 is a block diagram showing a storage system according to another example embodiment.

FIG. 12 is a block diagram showing a storage system according to another example embodiment. Referring to FIG. 12, a storage system 2000 may include a host 2100 and a storage device 2200 having a built-in weight learning device 2300 therein. The host 2100 may include one or more processors and one or more memories. The storage device 2200 may include one or more processors and one or more memories. Because the weight learning device 2300 is embedded in the storage device 2200, the weight learning device 2300 can continuously update the optimal weight to the throttler 2220 even during the run-time of the storage device 2200. Configurations of the host 2100 and the storage device 2200 are substantially the same as those of FIG. 1 except that the weight learning device 2300 is embedded in the storage device 2200. Therefore, description of the host 2100 will be omitted.

The storage device 2200 may include a storage controller 2210, a nonvolatile memory device 2230, a buffer 2250, and a weight learning device 2300. For example, storage controller 2210, the nonvolatile memory device 2230, the buffer 2250, and the weight learning device 2300 may be controlled by the one or more processors of the storage device 2200. Because the nonvolatile memory device 2230 and the buffer 2250 are identical to those of FIG. 1, descriptions thereof will be omitted.

The storage controller 2210 may store data in the nonvolatile memory device 2230 or transmit data stored in the nonvolatile memory device 2230 to the host 2100 in response to a request from the host 2100. The storage controller 2220 includes a throttler 2220 for performance consistency. The throttler 2220 is a component for write throttling that improves quality of service QoS by intentionally delaying transmission of a completion message Completion for a write command Write CMD. The throttler 2220 is updated with the weight set provided by the weight learning device 2300 at runtime of the storage device 2200. Accordingly, the throttler 2220 may calculate a throttling delay time TDT corresponding to optimal performance even under various workload conditions.

The throttler 2220 may be configured with a machine learning model that provides an optimal throttling delay time TDT according to the workload or state of the storage device 2200. Accordingly, the throttler 2220 provides a throttling delay time TDT according to the workload and state of the storage device 2200. Then, the storage controller 2210 transmits a completion message Completion to the host 2100 according to the throttling delay time TDT calculated based on machine learning.

The weight learning device 2300 generates an objective function having the performance PER of the storage device 2200 as an input and the weight of the throttler 2220 as an output. The weight learning device 2300 accumulates and learns performance according to the weight value of the throttler 2220 under various workloads and states occurring during the operation of the storage device 2200 without the supply of external label data. That is, the weight learning device 2300 generates an objective function optimized for the throttler 2220 using the accumulated weights and performance. That is, the weight learning device 2300 generates an objective function by using the performance PER calculated by itself during operation of the storage device 2200 as label data. The weight learning device 1300 generates a function for predicting a weight according to performance. Weights for providing optimal or highest performance are selected from the generated objective function, and the throttle 2200 may be set by the selected weights.

As described above, the storage system 2000 includes the storage device 2200 that generates a throttling delay time TDT using the weights learned by the weight learning device 2300. A throttling delay time TDT setting of the storage device 2200 performed depending on empirical knowledge may be automatically implemented by a machine learning model. In addition, as the weight learning device 2300 is built into the storage device 2200, optimal throttling is possible in runtime. Accordingly, the throttler 2220 may provide the storage device 2200 with adaptively optimized throttling delay time TDT even under various workload conditions.

Figure 13:
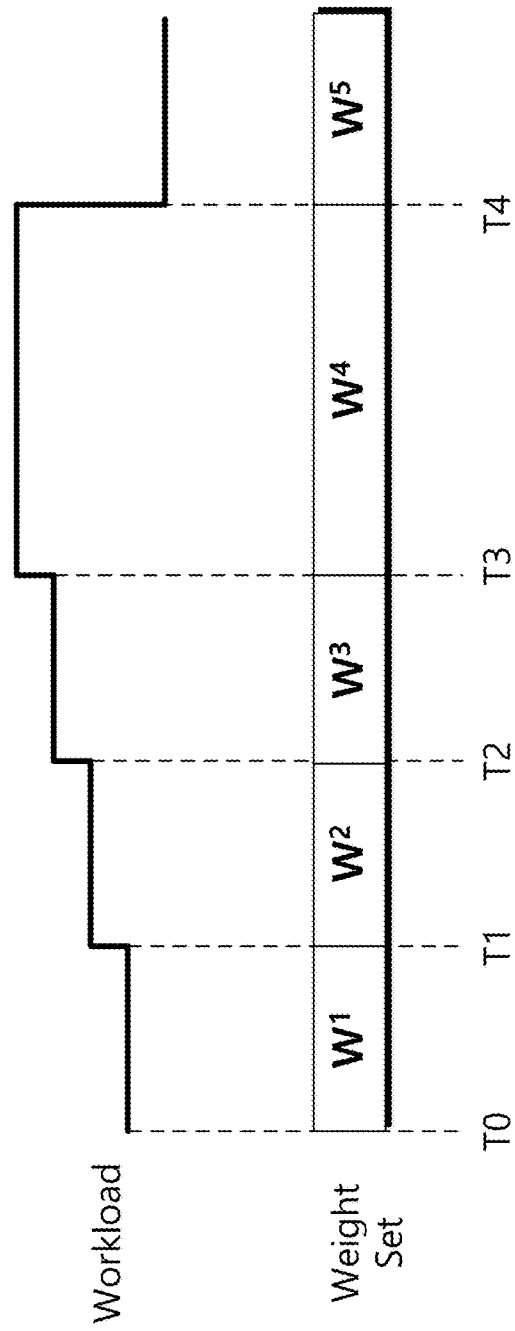
FIG. 13 is a graph illustrating an optimal weight that varies according to a change in workload of the storage device of FIG. 12 according to an example embodiment.

FIG. 13 is a graph illustrating a feature of providing an optimal weight that varies according to a change in workload of the storage device of FIG. 12. Referring to FIG. 13, the weight learning device 2300 may calculate weight sets adaptively to various workloads requested by the host 2100. Accordingly, the throttler 2220 may provide a throttling delay time TDT for providing optimal performance or quality of service QoS for each workload.

At time T0, the weight learning device 2300 will supply the first weight set $W^1$ to the throttler 2220. Also, at a time point T1 when the workload increases, the weight learning device 2300 supplies the second weight set $W^2$ to the throttler 2220 to provide optimal performance in the changed workload. At time T2 when the workload continuously increases, the weight learning device 2300 supplies the third weight set $W^3$ to the throttler 2220 to provide optimal performance in the increased workload. The update of the weight set by the weight learning device 2300 may be performed adaptively or variably according to the workload of the storage device 2200. Accordingly, it is possible to calculate the throttling delay time TDT capable of optimizing the performance of the storage device 2200 in runtime changing with various workload conditions.

Figure 14:
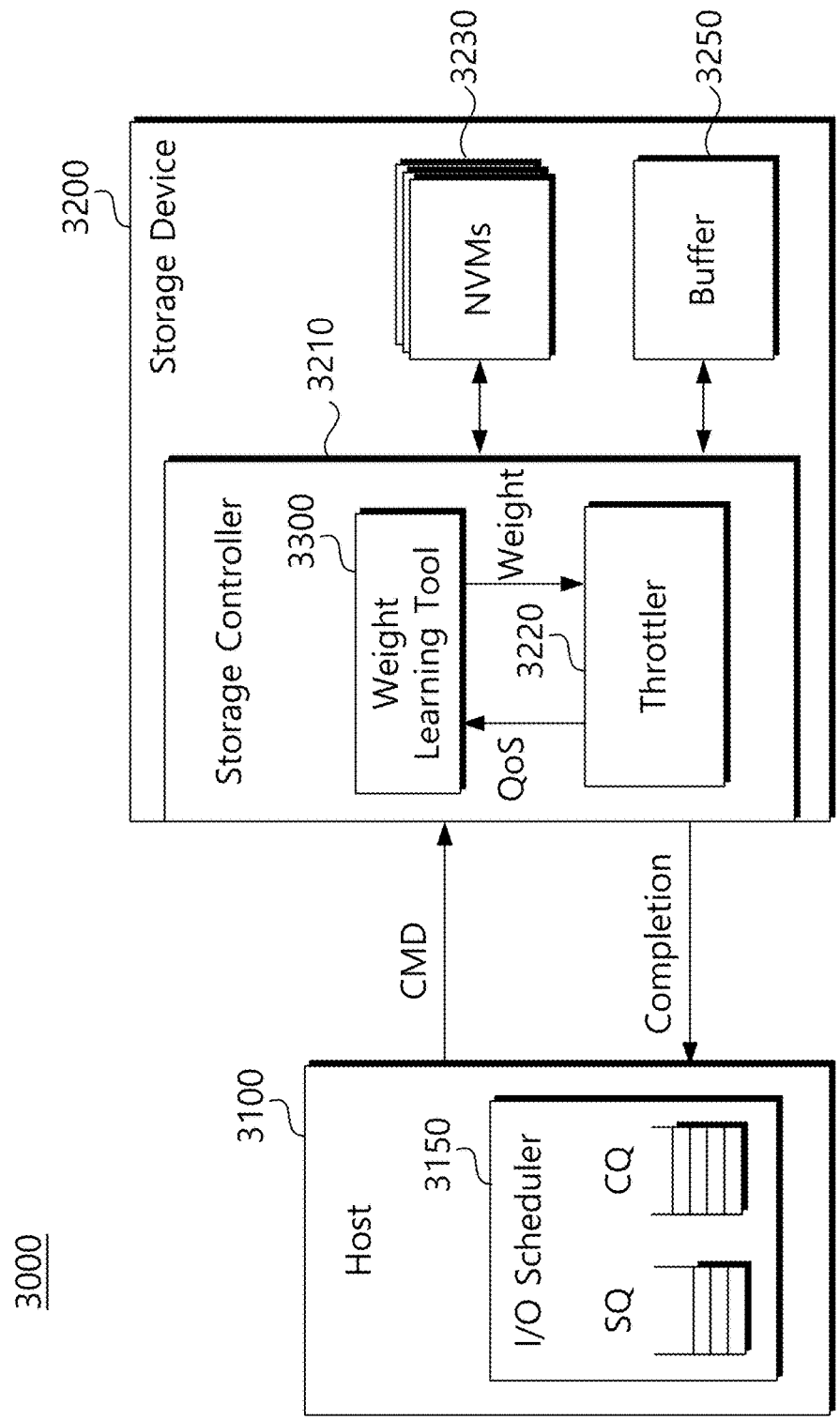
FIG. 14 is a block diagram showing a storage system according to still another example embodiment.

FIG. 14 is a block diagram showing a storage system according to still another example embodiment. Referring to FIG. 14, a storage system 3000 may include a host 3100 and a storage device 3200. The host 3100 may include one or more processors and one or more memories. The storage device 3200 may include one or more processors and one or more memories. The weight learning tool 3300 may be embedded in the storage controller 3210 of the storage device 3200.

The weight learning tool 3300 may continuously update the optimal weight to the throttler 3220 at runtime when the storage device 3200 provides a service. The weight learning tool 3300 may be implemented as hardware or may be installed in the storage controller 3210 as software. The weight learning tool 3300 may be controlled by the one or more processors of the storage controller 3200. Configurations of the host 3100 and the storage device 3200 are substantially the same as those of FIG. 12 except that the weight learning device 3300 is embedded in the storage controller 3210. Therefore, a description of these will be omitted.

Figure 15:
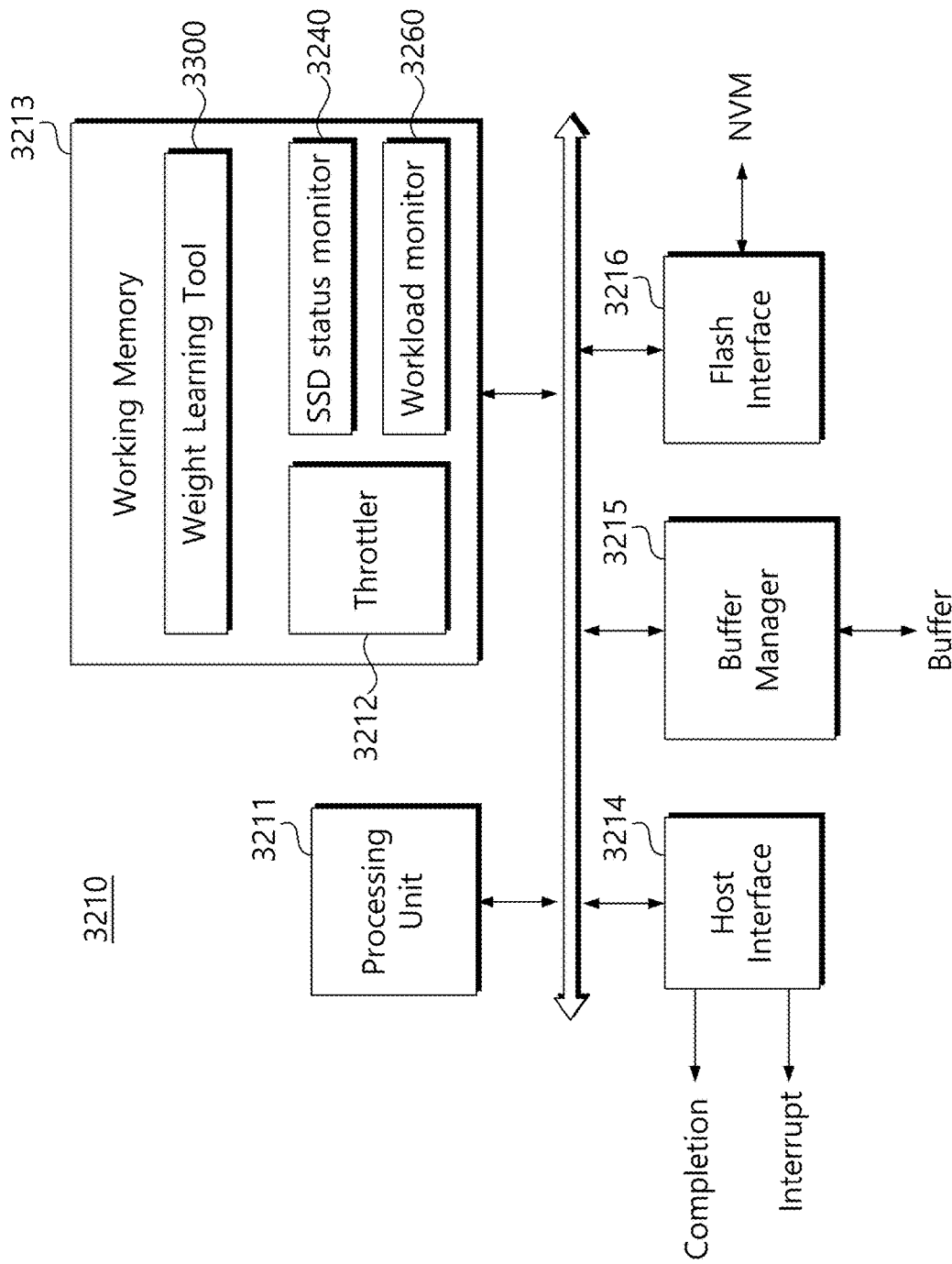
FIG. 15 is a block diagram showing configuration of the storage controller of FIG. 14 according to an example embodiment.

FIG. 15 is a block diagram showing an example configuration of the storage controller of FIG. 14. Referring to FIG. 15, a storage controller 3210 includes a processing unit 3211, a working memory 3213, a host interface 3214, a buffer manager 3215, and a flash interface 3216. The weight learning tool 3300 is implemented as software and loaded into the working memory 3213. Therefore, unlike the case of FIG. 2, the storage controller 3210 does not include a separate interface for communication with the weight learning tool 3300. Configurations of the processing unit 3211, the host interface 3214, the buffer manager 3215, and the flash interface 3216 are substantially the same as those of FIG. 2. Therefore, a description of these will be omitted.

Software (or firmware) or data for controlling the storage controller 3210 is loaded into the working memory 3213. Software and data loaded into the working memory 3213 are executed or processed by the processing unit 3211. In particular, according to an example embodiment, the throttler 3220, the status monitor 3240, the workload monitor 3260, and the weight learning tool 3300 may be loaded into the working memory 3213. The working memory 3213 may be implemented with, for example, SRAM.

The throttler 3220 driven by the processing unit 3211 may be implemented as a software module. The weight of the machine learning model included in the throttler 3220 may be provided from the weight learning tool 3300. The throttler 3220 calculates an optimal throttling delay time TDT according to the workload and state of the storage device 3200 based on machine learning. Status information of the storage device 3200 may be provided from the status monitor 3240. In addition, workload information of the storage device 3200 may be provided from the workload monitor 3260.

Examples of configurations of the storage controller 3210 have been described. According to the functions of the storage controller 3210, the throttler 3220, the status monitor 3240, the workload monitor 3260, and the weight learning tool 3300 have been described as an example embodiment implemented in firmware. However, the throttler 3220, the status monitor 3240, the workload monitor 3260, and the weight learning tool 3300 may be implemented inside the storage controller 3210 as hardware rather than firmware.

Figure 16:
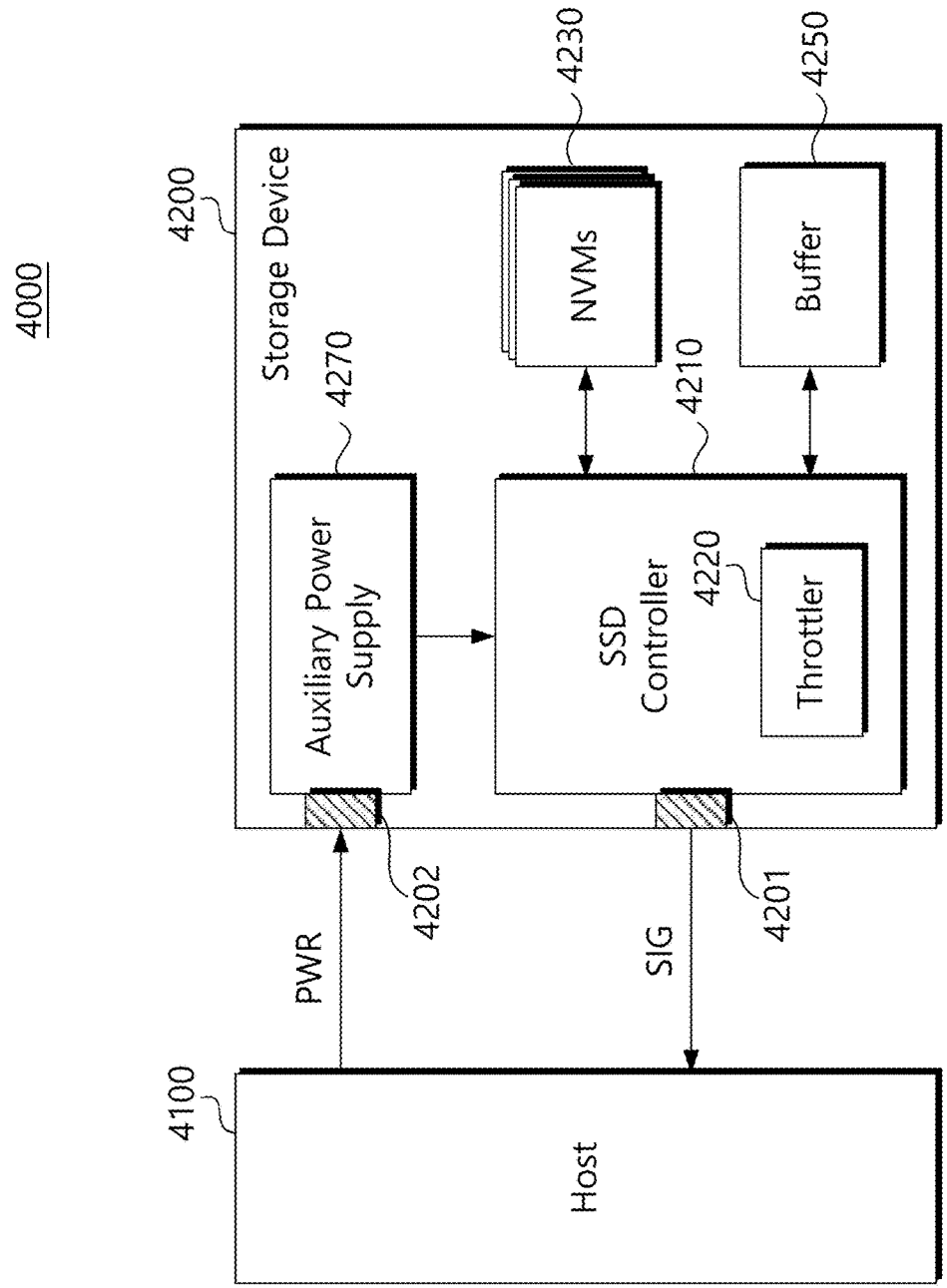
FIG. 16 is a block diagram showing a storage system including a solid state device according to an example embodiment.

FIG. 16 is a block diagram showing a storage system including a solid state device according to an example embodiment. Referring to FIG. 16, a storage system 4000 includes a host 4100 and a storage device 4200. In an example embodiment, the host 4100 and the storage device 4200 are the hosts 1100, 2100 and 3100 and the storage devices 1200, 2200 and 3200 described with reference to FIGS. 1 to 15 or may operate based on the operating method described with reference to FIG. 1 to FIG. 15.

The storage device 4200 exchanges a signal SIG with the host 4100 through a signal connector 4201 and receives power PWR through a power connector 4202. The storage device 4200 includes an SSD controller 4210, a plurality of nonvolatile memories 4230, a buffer memory 1240, and an auxiliary power supply 4270.

The SSD controller 4210 may control the plurality of nonvolatile memories 4230 in response to a signal SIG received from the host 4100. The plurality of nonvolatile memories 4230 may operate under the control of the SSD controller 4210. The auxiliary power supply 4270 is connected to the host 4100 through a power connector 4202. The auxiliary power supply 4270 can receive power PWR from the host 4100 and charge itself. The auxiliary power supply 4270 may provide power to the storage device 4200 when power supply from the host 4100 is unstable. The buffer memory 4250 may be used as a buffer memory of the storage device 4200. In an example embodiment, the storage device 4200 controls the throttling delay time TDT through the machine learning-based throttler 4220. In addition, the weight of the throttler 4220 may be calculated and provided by a weight learning device or tool connected to the inside or outside of the storage device 4200.

In some example embodiments, each of the components represented by a block, such as those illustrated in FIGS. 1-4, 7, 10, 12 and 14-16 may be implemented as various numbers of hardware, software and/or firmware structures that execute respective functions described above, according to example embodiments. For example, at least one of these components may include various hardware components including a digital circuit, a programmable or non-programmable logic device or array, an application specific integrated circuit (ASIC), transistors, capacitors, logic gates, or other circuitry using use a direct circuit structure, such as a memory, a processor, a logic circuit, a look-up table, etc., that may execute the respective functions through controls of one or more microprocessors or other control apparatuses. Also, at least one of these components may include a module, a program, or a part of code, which contains one or more executable instructions for performing specified logic functions, and executed by one or more microprocessors or other control apparatuses. Also, at least one of these components may further include or may be implemented by a processor such as a central processing unit (CPU) that performs the respective functions, a microprocessor, or the like. Functional aspects of example embodiments may be implemented in algorithms that execute on one or more processors. Furthermore, the components, elements, modules or units represented by a block or processing operations may employ any number of related art techniques for electronics configuration, signal processing and/or control, data processing and the like.

While aspects of example embodiments have been particularly shown and described, it will be understood that various changes in form and details may be made therein without departing from the spirit and scope of the following claims.

What is claimed is:

1. A throttling method for a storage device, the throttling method comprising:
    receiving a write command from a host;
    identifying, using a first machine learning model, a throttling delay time;
    transmitting a completion message to the host after the throttling delay time has elapsed;
    collecting weights of the first machine learning model and performance information of the storage device corresponding to the weights;
    learning the weights and the performance information to generate an objective function indicating a relationship between the weights and the performance information using a second machine learning model of a weight learning device;
    selecting a weight corresponding to a maximum performance using the objective function; and
    updating the first machine learning model with the weight.

2. The throttling method of claim 1, further comprising receiving state information and workload information of the storage device,
    wherein the identifying the throttling delay time is based on the state information and the workload information.

3. The throttling method of claim 2, wherein the state information or the workload information comprises any one or any combination of a number of write buffers in use, a write ratio, a queue depth, and a write amplification factor of the storage device.

4. The throttling method of claim 1, further comprising identifying the performance information using a weighted average of throughput, quality of service, and consistency.

5. The throttling method of claim 1, wherein further comprising training the second machine learning model by applying a Bayesian Optimization Surrogate Model for generating the objective function.

6. The throttling method of claim 5, wherein the objective function maps the weights as inputs and the performance information as outputs.

7. The throttling method of claim 1, wherein an initial weight of the first machine learning model is provided as a random value.

8. A storage device comprising:
    a non-volatile memory device;
    a buffer memory configured to buffer write data corresponding to a write command before writing the write data to the non-volatile memory device;
    one or more processors configured to:
        identify a throttling delay time using a first machine learning model;
        control transmission of a completion message after the throttling delay time has elapsed;
        collect weights of the first machine learning model and performance information of the storage device; and
        generate an objective function indicating a relationship between the weights and the performance information using a second machine learning model.

9. The storage device of claim 8, wherein the one or more processors are further configured to control the first machine learning model to identify the throttling delay time using state information and workload information of the storage device.

10. The storage device of claim 9, wherein the state information of the storage device or the workload information indicates any one or any combination of a number of write buffers in use, a write ratio, a queue depth, and a write amplification factor of the storage device.

11. The storage device of claim 8, wherein the one or more processors are further configured to:
    collect the weights of the first machine learning model and the performance information of the storage device;
    generate the objective function indicating the relationship between the weights and the performance information; and identify selected weights corresponding to target performance using the objective function.

12. The storage device of claim 11, wherein the one or more processors are further configured to map the weights as inputs of the objective function and the performance information as outputs of the objective function.

13. The storage device of claim 12, wherein the one or more processors are further configured to train the second machine learning model by applying a Bayesian Optimization Surrogate Model for generating the objective function.

14. The storage device of claim 11, wherein the target performance corresponds to maximum performance of the storage device.

15. The storage device of claim 8, wherein the one or more processors are further configured to identify the performance information of the storage device using a weighted average of throughput, quality of service, and consistency.

16. A storage system, comprising:
a storage device comprising one or more first processors configured to control the storage device to:
identify a throttling delay time corresponding a write command from a host; and
transmit a completion message to the host after the throttling delay time has elapsed; and
a weight learning device comprising one or more second processors configured to control the weight learning device to:
collect weights of a first machine learning model and performance information of the storage device corresponding to the weights; and
generate an objective function indicating a relationship between the weights and the performance information using a second machine learning model.

17. The storage system of claim 16, wherein the first machine learning model is configured to identify the throttling delay time based on state information and workload information of the storage device.

18. The storage system of claim 16, wherein the second machine learning model is trained by applying a Bayesian Optimization Surrogate Model for generating the objective function.

19. The storage system of claim 16, wherein the one or more second processors are further configured to repeat training of the second machine learning model until the performance information is equal to or higher than a reference level.

20. The storage system of claim 16, wherein the performance information of the storage device is identified using a weighted average of throughput, quality of service, and consistency.

* * * * *